(12) United States Patent
Hayashi

(10) Patent No.: US 10,268,391 B2
(45) Date of Patent: Apr. 23, 2019

(54) COMPUTER SYSTEM INCLUDING SERVER STORAGE SYSTEM AND MANAGEMENT SYSTEM

(71) Applicant: Hitachi, Ltd., Tokyo (JP)

(72) Inventor: Shinichi Hayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 81 days.

(21) Appl. No.: 15/507,671

(22) PCT Filed: Nov. 6, 2014

(86) PCT No.: PCT/JP2014/079441
§ 371 (c)(1),
(2) Date: Feb. 28, 2017

(87) PCT Pub. No.: WO2016/071988
PCT Pub. Date: May 12, 2016

(65) Prior Publication Data
US 2017/0308301 A1    Oct. 26, 2017

(51) Int. Cl.
*G06F 12/00* (2006.01)
*G06F 3/06* (2006.01)
(Continued)

(52) U.S. Cl.
CPC ............... *G06F 3/061* (2013.01); *G06F 3/06* (2013.01); *G06F 3/0604* (2013.01); *G06F 11/3051* (2013.01); *G06F 12/00* (2013.01); *G06F 13/385* (2013.01); *H04L 67/2842* (2013.01); *G06F 12/02* (2013.01); *H04L 67/1097* (2013.01)

(58) Field of Classification Search
CPC .......... G06F 3/061; G06F 3/06; G06F 3/0604
See application file for complete search history.

(56) References Cited

U.S. PATENT DOCUMENTS

| 2006/0069943 A1 | 3/2006 | Nakamura et al. |
| 2007/0061539 A1 | 3/2007 | Nonaka et al. |

(Continued)

FOREIGN PATENT DOCUMENTS

| JP | 2006-079495 A | 3/2006 |
| JP | 2007-079774 A | 3/2007 |

(Continued)

OTHER PUBLICATIONS

International Search Report and Written Opinion for PCT App No. PCT/JP2014/079441 dated Jan. 20, 2015, 8 pgs.

*Primary Examiner* — Gurtej Bansal
(74) *Attorney, Agent, or Firm* — Procopio, Cory, Hargreaves & Savitch LLP

(57) ABSTRACT

A server storage system includes: a server system including a plurality of server processors; a storage system including a plurality of storage devices and a plurality of storage processors; and a plurality of interface devices coupled to the plurality of server processors and the plurality of storage processors by a bus. A logical volume to which a ST processor unit inputs/outputs data is provided from the ST processor unit (a storage processor or a core of the storage processor) which is directly connected to an interface device of a server LPAR (a logical partition of a server system) including an SV processor unit (a server processor or a core of the server processor), to the server LPAR.

11 Claims, 15 Drawing Sheets

(51) Int. Cl.
*G06F 11/30* (2006.01)
*G06F 13/38* (2006.01)
*H04L 29/08* (2006.01)
*G06F 12/02* (2006.01)

(56) References Cited

U.S. PATENT DOCUMENTS

2008/0155243 A1* 6/2008 Diep .................. G06F 9/45558
 713/2
2014/0059302 A1 2/2014 Hayakawa et al.

FOREIGN PATENT DOCUMENTS

JP 5174941 B2 4/2013
JP 2014-041395 A 3/2014

* cited by examiner

Virtual volume management table 810

| Virtual volume # | Volume capacity | Allocated capacity | Pool # |
|---|---|---|---|
| 0 | 500GB | 200GB | 0 |
| 1 | 300GB | 200GB | 1 |
| 2 | 200GB | 30GB | 0 |
| ⋮ | ⋮ | ⋮ | ⋮ |

Fig. 7

Storage pool management table 820

| Pool # | RAID group list |
|---|---|
| 0 | 1, 5, 8, 10 |
| 1 | 2, 3, 4, 6, 7 |
| 2 | N/A |
| ⋮ | ⋮ |

Fig. 8

RAID group management table 830

| RAID group # | RAID level | Storage device # | Device type | Capacity | Drive I/F # |
|---|---|---|---|---|---|
| 0 | 10 | 0, 1, 2, 3 | SSD | 1,000 GB | 0, 4 |
| 1 | 10 | 4, 5, 6, 7 | SSD | 1,000 GB | 0, 4 |
| 2 | 5 | 8, 9, 10, 11 | HDD | 1,500 GB | 1, 5 |
| ⋮ | ⋮ | ⋮ | ⋮ | ⋮ | ⋮ |

Fig. 9

Storage device management table 840

| Storage device # | Physical capacity | Device type | Device I/F # |
|---|---|---|---|
| 0 | 500GB | SSD | 0, 4 |
| 1 | 500GB | SSD | 0, 4 |
| 2 | 500GB | SSD | 0, 4 |
| ⋮ | ⋮ | ⋮ | ⋮ |

Fig. 10

Device I/F management table 841

| Device I/F # | ST processor # | Controller # |
|---|---|---|
| 0 | 0 | 0 |
| 1 | 0 | 0 |
| 2 | 1 | 0 |
| ⋮ | ⋮ | ⋮ |

Fig. 11

ST processor management table 842

| ST processor # | ST core # | ST memory address | Controller # |
|---|---|---|---|
| 0 | 0, 1, 2, 3 | 0-99 | 0 |
| 1 | 4, 5, 6, 7 | 100-199 | 0 |
| 0 | 0, 1, 2, 3 | 0-99 | 1 |
| ⋮ | ⋮ | ⋮ | ⋮ |

Fig. 12

ST core management table 843

| ST core # | Handled virtual volume # | Controller # |
|---|---|---|
| 0 | 0 | 0 |
| 1 | 1, 3, 5 | 0 |
| 2 | 2, 4 | 1 |
| ⋮ | ⋮ | ⋮ |

Fig. 13

ST memory management table 844

| ST processor # | ST memory address | CLPR # | Virtual volume # | Controller # |
|---|---|---|---|---|
| 0 | 0-99 | 0 | 0 | 0 |
| 0 | 100-199 | 1 | 1, 3, 5 | 0 |
| 0 | 200-299 | 2 | 2, 4 | 0 |
| ⋮ | ⋮ | ⋮ | ⋮ | ⋮ |

Fig. 14

SV processor management table 901

| SV processor # | SV core # | SV memory address | SVIF # |
|---|---|---|---|
| 0 | 0, 1, 2, 3 | 0-99 | 0, 1 |
| 1 | 4, 5, 6, 7 | 100-199 | 2, 3 |
| 2 | 8, 9, 10, 11 | 200-299 | 4, 5 |
| ⋮ | ⋮ | ⋮ | ⋮ |

Fig. 15

LPAR management table 902

| LPAR # | SV core # | SV memory address | SV memory capacity | SVIF# |
|---|---|---|---|---|
| 0 | 0, 1, 2, 3, 4, 5, 6, 7 | 0-99 | 16 GB | 0, 1 |
| 1 | 8 | 100-199 | 4 GB | 2 |
| ⋮ | ⋮ | ⋮ | ⋮ | ⋮ |

Fig. 16

SVIF management table 1001

| SVIF# | SV processor # | ST processor # |
|---|---|---|
| 0 | 0 | 0, 4 |
| 1 | 1 | 2, 6 |
| 2 | 2 | 1, 3 |
| ⋮ | ⋮ | ⋮ |

Fig. 17

RAID group allocation table 1002

| RAID group # | Allocation state | Server storage LPAR # |
|---|---|---|
| 0 | Dedicated | 0 |
| 1 | Dedicated | 0 |
| 2 | Dedicated | 1 |
| ⋮ | ⋮ | ⋮ |

Fig. 18

Device I/F allocation table 1003

| Device I/F # | Allocation state | Server storage LPAR # |
|---|---|---|
| 0 | Dedicated | 0 |
| 1 | Shared | 0 |
| 2 | Dedicated | 1 |
| ⋮ | ⋮ | ⋮ |

Fig. 19

ST core allocation table 1004

| ST processor | ST core # | Allocation state | Server storage LPAR # |
|---|---|---|---|
| 0 | 0 | Dedicated | 0 |
| 0 | 1 | Dedicated | 0 |
| 0 | 2 | Dedicated | 1 |
| ⋮ | ⋮ | ⋮ | ⋮ |

Fig. 20

ST memory allocation table 1005

| CLPAR # | Allocation state | Server storage LPAR # |
|---|---|---|
| 0 | Dedicated | 0 |
| 1 | Dedicated | 0 |
| 2 | Dedicated | 1 |
| ⋮ | ⋮ | ⋮ |

Fig. 21

SVIF allocation table 1006

| SVIF # | Allocation state | Server storage LPAR # |
|---|---|---|
| 0 | Dedicated | 0 |
| 1 | Shared | 0 |
| 2 | Dedicated | 1 |
| ⋮ | ⋮ | ⋮ |

Fig. 22

LPAR allocation table 1007

| LPAR # | Allocation state | Server storage LPAR # |
|---|---|---|
| 0 | Dedicated | 0 |
| 1 | Shared | 0 |
| 2 | Shared | 1 |
| ⋮ | ⋮ | ⋮ |

Fig. 23

Server storage LPAR creation screen — 180

| Item | | | Input | Unit | Dedicated allocation |
|---|---|---|---|---|---|
| Server | SV processor | | 1 | Socket | ✓ |
| | | | | Core | |
| | SV memory capacity | | 16 | GB | ✓ |
| | The number of SVIFs | | 1 | Number | ✓ |
| Storage | Volume | Capacity | 50 | GB | |
| | | Quantity | 3 | Number | |
| | Device | Total capacity | 500 | GB | |
| | | Type | SSD | | ✓ |
| | | RAID level | 10 | | |
| | The number of device I/Fs | | 1 | Number | ✓ |
| | ST processor | | 1 | Socket | ✓ |
| | | | | Core | |
| | ST memory capacity | | 16 | GB | ✓ |
| Redundant configuration | | | ✓ | | |

Create

Server storage LPAR creation screen

Server LPAR selection

| Server # | LPAR # | Select |
|---|---|---|
| 0 | 0 | |
| 0 | 1 | |
| 1 | 0 | ✓ |
| 1 | 1 | |

Virtual volume selection

| Virtual volume # | Volume capacity | Select |
|---|---|---|
| 0 | 500GB | |
| 1 | 300GB | ✓ |
| 2 | 200GB | ✓ |

Storage resource selection

| Item | Input | Unit | Dedicated allocation |
|---|---|---|---|
| The number of device I/Fs | | Number | |
| ST processor | | Socket | ✓ |
| | 1 | Core | |
| ST memory capacity | | GB | |
| Redundant configuration | | | |

Create

Fig. 27

COMPUTER SYSTEM INCLUDING SERVER STORAGE SYSTEM AND MANAGEMENT SYSTEM

CROSS-REFERENCE TO RELATED APPLICATIONS

This application is a U.S. National Stage entry of PCT Application No: PCT/JP2014/079441 filed Nov. 6, 2014, the contents of which are incorporated herein by reference.

TECHNICAL FIELD

The present invention generally relates to a logical partitioning technology.

BACKGROUND ART

Although a plurality of loads can be integrated on one server by virtue of an improvement in the performance of the server, the plurality of integrated loads may affect each other. A server LPAR (Logical Partitioning) technology of logically dividing the server is used to prevent the loads from affecting each other. In one server including a plurality of CPUs and a plurality of memories (for example, memory modules) divided by the server LPAR technology, if one LPAR includes a CPU and a memory not directly connected to the CPU, the CPU and the memory cannot directly communicate. Therefore, the performance may be reduced, and the LPAR may be affected by other loads. Here, the "direct connection" between the CPU and the memory is physical connection without the involvement of another CPU between the CPU and the memory, in other words, connection without transfer from the CPU to another CPU in the communication between the CPU and the memory.

To solve such a problem, there is a known technology, in which a connection relationship between a CPU and a memory module is taken into account to form an LPAR (for example, PTL 1).

A technology of a storage is also known, in which components included in the storage are logically divided and time-shared (for example, PTL 2).

CITATION LIST

Patent Literature

[PTL 1] Japanese Patent No. 5174941
[PTL 2] Japanese Patent Laid-Open No. 2006-79495

SUMMARY OF INVENTION

Technical Problem

The LPAR technology can be applied to a server storage system including a server system and a storage system to logically divide the server storage system. In this case, one LPAR includes part of the server system and part of the storage system. Therefore, the server storage system is logically divided end-to-end from the server system to the storage system.

In this case, the physical connection between the server system and the storage system cannot be taken into account by a combination of PTL 1 and PTL 2. Therefore, an inappropriate path may be used in every communication between the server system and the storage system (forwarding may occur between processors), and as a result, the I/O performance of the server storage system is reduced.

Solution to Problem

A server storage system includes a plurality of interface devices, a server system, and a storage system. At least one of the plurality of interface devices may be involved in one of the server system and the storage system.

The server system includes: a plurality of server processors coupled to the plurality of interface devices by a bus; and a plurality of server memories coupled to the plurality of server processors by a bus. In the server system, direct connection without the involvement of another server processor between the server processors and the server memories and indirect connection with the involvement of another server processor between the server processors and the server memories may be mixed (although the direct connection and the indirect connection are mixed in Embodiments described later, the direct connection and the indirect connection may not be mixed).

A storage system includes: a plurality of storage devices; a plurality of device interfaces (device I/Fs) coupled to the plurality of storage devices; a plurality of storage processors coupled to the plurality of interface devices by a bus and coupled to a plurality of device I/Fs; and a plurality of storage memories coupled to the plurality of storage processors by a bus. In the storage system, direct connection without the involvement of another storage processor between the storage processors and the storage memories and indirect connection with the involvement of another storage processor between the storage processors and the storage memories may be mixed (although the direct connection and the indirect connection are mixed in Embodiments described later, the direct connection and the indirect connection may not be mixed). The bus between the plurality of storage processors and the plurality of interface devices is a bus in the same format as the format of the bus between the plurality of server processors and the plurality of interface devices.

A logical volume to which a ST processor unit inputs/outputs data is configured to be provided from the ST processor unit which is directly connected to an interface device of a server LPAR that includes an SV processor unit and that is a logical partition of the server system, to the server LPAR. The SV processor unit is a server processor or a core of the server processor, and the ST processor unit is a storage processor or a core of the storage processor. Note that the ST processor unit indirectly connected to the interface device is an ST processor unit coupled to the interface device through another storage processor.

Advantageous Effects of Invention

Paths of the I/O from the SV processor units to the logical volumes are paths determined based on the physical connection relationship between the server system and the storage system. An unnecessarily large amount of forwarding (forwarding between processors) does not occur in the I/O for the logical volumes. Therefore, the I/O performance is improved.

BRIEF DESCRIPTION OF DRAWINGS

FIG. 7 shows a virtual volume management table.

FIG. 8 shows a storage pool management table.

FIG. 9 shows a RAID group management table.

FIG. 10 shows a storage device management table.

FIG. 11 shows a device I/F management table.

FIG. 12 shows an ST processor management table.

FIG. 13 shows an ST core management table.

FIG. 14 shows an ST memory management table.

FIG. 15 shows an SV processor management table.

FIG. 16 shows an LPAR management table.

FIG. 17 shows an SVIF management table.

FIG. 18 shows a RAID group allocation table.

FIG. 19 shows a device I/F allocation table.

FIG. 20 shows an ST core allocation table.

FIG. 21 shows an ST memory allocation table.

FIG. 22 shows an SVIF allocation table.

FIG. 23 shows an LPAR allocation table.

FIG. 24 shows a server storage LPAR creation screen related to new creation.

FIG. 27 shows a server storage LPAR creation screen related to creation using existing LPARs.

DESCRIPTION OF EMBODIMENTS

Figure 1:
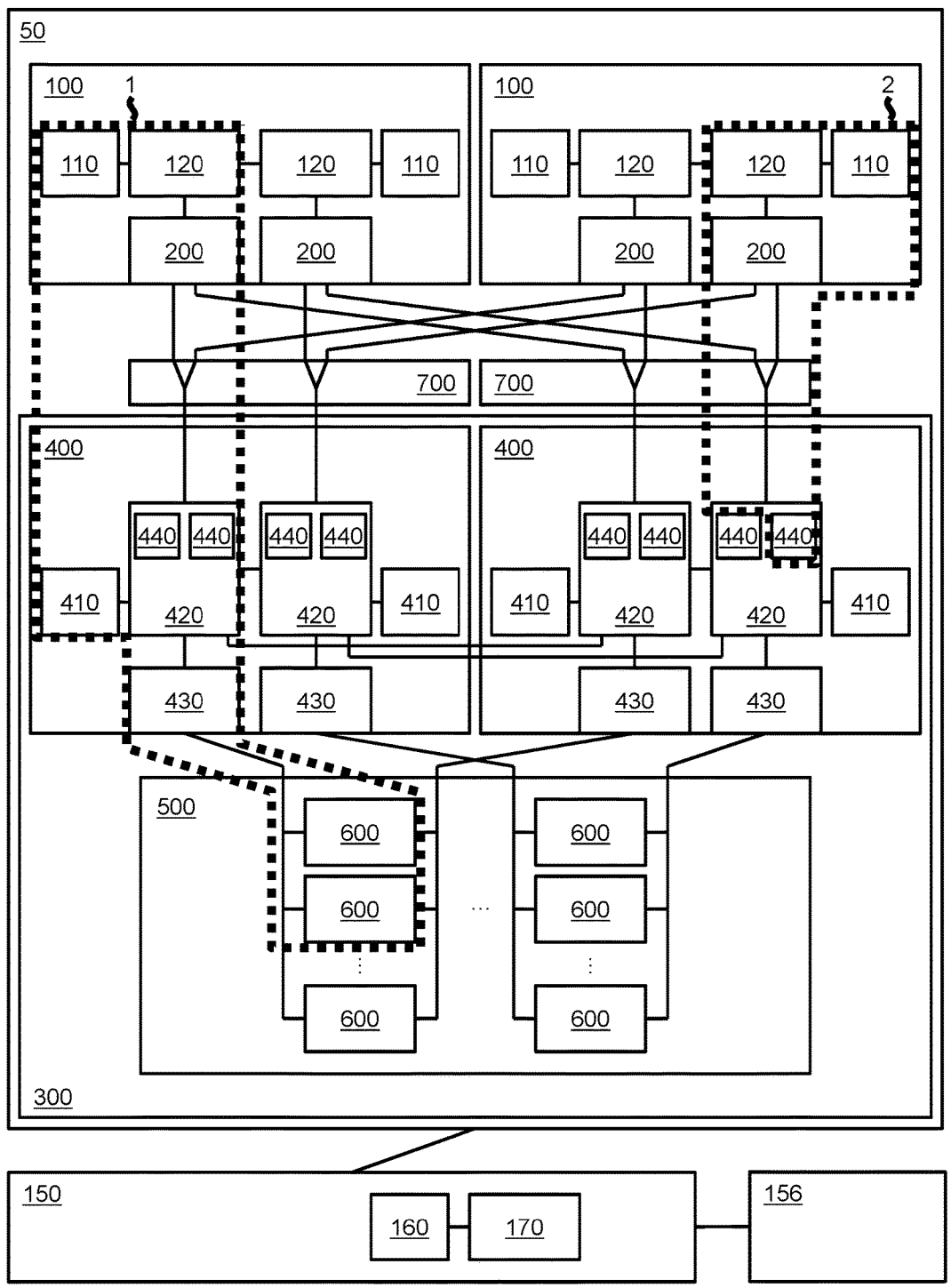
FIG. 1 shows a configuration of a computer system according to Embodiment 1.

Hereinafter, some Embodiments will be described.

Although information is expressed as "kkk tables" in some cases in the following description, the information may be expressed by a data configuration other than the tables. To indicate that the information does not depend on the data configuration, at least one of the "kkk tables" may be called "kkk information". Furthermore, two or more tables may be integrated into one table, and one table may be divided into two or more tables.

Although numbers (identification numbers) are used as identification information of various elements (for example, storage devices and processors) in the following description, other types of identification information may be used in place of or in addition to the numbers.

In the following description, although a "program" serves as the subject in the description of a process in some cases, the program is executed by a processor (for example, a CPU (Central Processing Unit) to execute a prescribed process while appropriately using storage resources (for example, memories) and/or communication interface devices (for example, communication ports). Therefore, the subject of the process may be the processor. The process described by handling the program as the subject may be handled as a process executed by the processor or an apparatus including the processor. The processor may include a hardware circuit configured to execute part or all of the process. The program may be installed on each controller from a program source. The program source may be, for example, a program distribution computer or a storage medium.

A management system may include one or more computers. Specifically, when, for example, a management computer displays information (specifically, when the management computer displays information on a display device of the management computer or when the management computer transmits information for display to a remote computer for display), the management computer is the management system. When, for example, a plurality of computers realize functions identical or similar to the management computer, the plurality of computers (may include a computer for display when the computer for display performs the display) are the management system. Input of information to the computer and output of information from the computer may be performed by an input/output device included in the computer. Although examples of the input/output device include a display device, a keyboard, and a pointing device, other devices may be adopted in place of or in addition to at least one of these. A serial interface device or an Ethernet interface device (Ethernet is a registered trademark) may be adopted in place of the input/output device, and the computer for display including the display device, the keyboard, and the pointer device may be coupled to the interface device. The computer may transmit the information for display to the computer for display, or the computer may receive information for input from the computer for display to output (for example, display) and input the information. In Embodiments, a management server 150 is the management computer, and a management client 156 is the computer for display.

Embodiment 1

FIG. 1 shows a configuration of a computer system according to Embodiment 1.

The computer system includes a server storage system (hereinafter, SS system) 50 and a management system of the SS system 50. The management system includes: the management server 150 coupled to and capable of communicating with the SS system 50; and the management client 156 coupled to and capable of communicating with the management server 150. The SS system 50 includes a server system and a storage system. The server system includes one or more servers 100. The storage system includes one or more storage subsystems. In an example of FIG. 1, the server system includes two servers 100. The storage system includes one storage subsystem, and therefore, the storage subsystem is a storage system 300. The servers 100 and the storage system 300 may be stored in one case. The number of servers 100 included in the SS system 50 may be one or more, and the number of storage systems 300 included in the SS system 50 may also be one or more.

The servers 100 include server (SV) memories 110, server (SV) processors 120, and server I/Fs (SVIFs) 200. The SV memories 110 and the SV processors 120 are coupled to each other through an internal bus. The SV memories 110 are memories and are configured to store programs and data, such as an application, an OS (Operating System), and a driver, for controlling the servers 100. The SV processors 120 are microprocessors and are configured to execute processes according to the programs in the SV memories 110. The SV processors 120 in the same server are coupled to each other through a bus. The SVIFs are interface devices and are coupled to the SV processors 120 through a server side bus and coupled to the storage system 300 through a storage side bus to control communication between the SV processors 120 and the storage system 300.

The SV processors 120 and the SVIFs 200 are coupled by the server side bus. The SVIFs 200 and ST processors 420 are coupled by a storage side bus that is a bus in the same format as the server side bus (bus capable of communication based on the same protocol as the protocol of the communication through the server side bus). In the present Embodiment, PCI Express (PCIe) is used as the server side bus and the storage side bus. The server side bus and the storage side bus may be substrates, such as backplanes, or may be cables. In the present system 50, coupling from the servers 100 to the storage system 300 is realized by a bus in the same format as the internal bus of the servers 100 to allow DMA transfer between the servers 100 and a storage area of the storage system 300. In response to a request (for example, an I/O (Input/Output) request that is a write request or a read request) issued from the SV processor 120, the storage (ST) processor 420 in the storage system 300 starts a DMA engine mounted on the SVIF 200 to transfer data on a storage (ST) memory 410 in the storage system 300 to the SV memory 110 or transfer data on the SV memory 110 to the ST memory 410 in the storage system 300. The configuration constructs an integrated system coupling the servers 100 and the storage system 300 by a wideband bus without relying on a forward function of a network switch of a so-called SAN (Storage Area Network) or the like, and the configuration realizes an extension of the bandwidth and an improvement in the latency. The I/O performance can also be improved by realizing the DMA transfer in the present system 50.

Note that the servers 100 may include Root Complex (RC) coupled to the SV processors 120 through the internal bus and coupled to the SVIFs 200 through the server side bus.

The SVIFs 200 are an example of interface devices. The SVIFs 200 compress (or do not compress) write data from the servers 100 (data to be written according to a write request) and transfer the write data to the storage system 300 (for example, the ST processors 420 or the ST memories 410). The SVIFs 200 expand (or do not expand) read data from the storage system 300 (data to be read that is read according to a read request) and transfer the read data to the servers 100 (for example, the SV processors 120 or the SV memories 110).

The storage system 300 includes storage (ST) controllers 400 (redundant ST controllers 400) and a storage apparatus 500. The storage apparatus 500 stores data accessed from the servers 100. The ST controllers 400 are coupled to the storage apparatus 500 and the servers 100 and are configured to control access to the storage apparatus 500. The ST controllers 400 will be simply called "controllers" in some cases.

The ST controllers 400 include the storage (ST) memories 410, the storage (ST) processors 420, and drive interface devices (device I/Fs) 430. The number of elements of at least one type of element among the elements included in the ST controllers 400 may be two or more. The ST memories 410, the ST processors 420, and the device I/Fs 430 are coupled to each other through an internal bus. The ST memories 410 are memories and are configured to store programs and data for controlling the storage system 300. The ST processors 420 are microprocessors coupled to the SVIFs 200 through the storage side bus and are configured to execute processes according to the programs stored in the ST memories 410. The two ST processors 420 in one of the ST controllers 400 are coupled to the two ST processors 420 in the other ST controller 400, respectively, through a bus between the ST controllers 400. Note that the number of ST processors 420 may be two or more. When there are a plurality of ST processors 420 in each ST controller 400, the plurality of ST processors in one of the ST controllers 400 are coupled to the plurality of ST processors 420 in the other ST controller 400, respectively, through the bus between the ST controllers. It can be stated that the plurality of ST processors 420 coupled to each other through the bus between the ST controllers are redundant ST processors 420. The device I/Fs 430 are coupled to the storage apparatus 500 through the storage apparatus side bus and are configured to control communication between the ST processors 420 and the storage apparatus 500. Note that the ST controllers 400 may include RC (Root Complex) coupled to the ST processors 420 through the internal bus and coupled to the SVIFs 200 through the storage side bus. Although the ST processors 420 include two cores (storage (ST) cores) 440, the number of ST cores 440 included in the ST processors 420 may be one or three or more.

The storage apparatus 500 includes a plurality of storage devices 600. The device I/Fs 430 of each of the redundant ST controllers 400 (two ST controllers 400) are coupled to the plurality of storage devices 600 by a bus.

The SS system 50 includes a plurality of interface extension apparatuses 700 corresponding to the plurality of ST controllers 400. A plurality of (for example, all) servers 100 are coupled to each interface extension apparatus 700. The involvement of the interface extension apparatuses 700 between the servers 100 and the ST controllers 400 allows increasing the number of paths between the servers 100 and the ST controllers 400. More specifically, the interface extension apparatus 700 allows directly connecting more servers 100 to one ST controller 400. The "direct connection" between the servers 100 and the ST controllers 400 is physical connection without the involvement of another ST controller 400 between the servers 100 and the ST controllers 400. On the other hand, "indirect connection" between the servers 100 and the ST controllers 400 is physical connection with the involvement of another ST controller 400 between the servers 100 and the ST controllers 400. The "direct connection" between the servers 100 and the ST controllers 400 ("direct connection" between the SV processors 120 and the ST processors 420 (ST memories 410)) is realized even when apparatuses for increasing the number of paths, such as the interface extension apparatuses 700, are involved between the servers 100 and the ST controllers 400.

The interface extension apparatuses 700 are, for example, PCIe switches. Each server 100 includes a plurality of SVIFs 200, for example, two SVIFs 200. The two SVIFs 200 are coupled to the two ST controllers 400 through the interface extension apparatuses 700. Each server 100 includes two SVIFs 200, and the redundancy of hardware can be ensured. The two SVIFs 200 in one server 100 are coupled to two storage systems 300 through the interface extension apparatuses 700 respectively. One SVIF 200 is coupled to the two ST controllers 400 in one storage system 300 through the interface extension apparatuses 700. According to the configuration, more storage systems 300 can be coupled to the server 100 by mounting two SVIFs 200 on the server 100, and wideband and high-performance storage resources can be provided to the server 100. Note that the interface extension apparatuses 700 may not be included.

Each of a server storage LPAR 1 and a server storage LPAR 2 is an example of a server storage LPAR. The server storage LPAR is a partition obtained by logically dividing the SS system 50 end-to-end from the servers 100 to the storage systems 300 (logical partition of the SS system 50), typically, a logical partition including part of the servers 100 and part of the storage systems 300. The server storage LPAR 1 includes one SV processor 120, one SV memory 110, one SVIF 200, one ST processor 420, one ST memory 410, one device I/F 430, and two storage devices 600. The server storage LPAR 2 includes one SV processor 120, one SV memory 110, one SVIF 200, and one ST core 440. The server storage LPAR 1 is a server storage LPAR from the SV processor 120 to the storage devices 600, and the sever storage LPAR 2 is a server storage LPAR from the SV processor 120 to the ST core 440. In the configuration of the server storage LPAR, the SV processor 120 is directly connected to the SVIF 200, and the ST processor 420 is directly connected to the SVIF 200. Therefore, the SV processor and the ST processor (ST memory) are directly connected through the SVIF 200. The types of essential elements (elements to be set to dedicated allocation described later) of the server storage LPAR include at least part of the SV processors, at least part of the SVIFs, and at least part of the ST processors, and at least part (for example, CLPAR described later) of the storage devices, the device I/Fs, and the ST memories are arbitrary elements of the user. In this way, the configuration of the server storage LPAR is flexible.

Here, the "direct connection" between the SV processor 120 and the SVIF 200 is physical connection without the involvement of another SV processor 120 between the SV processor 120 and the SVIF 200. On the other hand, "indirect connection" between the SV processor 120 and the SVIF 200 is physical connection with the involvement of another SV processor 120 between the SV processor 120 and the SVIF 200.

The "direct connection" between the ST processor 420 and the SVIF 200 is physical connection without the involvement of another ST processor 420 between the ST processor 420 and the SVIF 200. On the other hand, "indirect connection" between the ST processor 420 and the SVIF 200 is physical connection with the involvement of another ST processor 420 between the ST processor 420 and the SVIF 200.

The "direct connection" between the SV processor and the ST processor (ST memory) is physical connection without the involvement of another SV processor and another ST processor between the SV processor and the ST processor (ST memory). On the other hand, "indirect connection" between the SV processor and the ST processor (ST memory) is physical connection with the involvement of another SV processor or another ST processor between the SV processor and the ST processor (ST memory). A request issued from the SV processor is first received by the ST processor "directly connected" to the SV processor of the issuer of the request among the plurality of ST processors.

The management server 150 includes: an interface device (not shown) coupled to and capable of communicating with the SS system 50 (for example, at least one of the servers 100 and the storage systems 300) and the management client 156; an MG (manager) memory 160; and an MG processor 170 coupled to them. The MG (manager) memory 160 is an example of a storage resource and is a memory. The MG processor 170 is a microprocessor.

The management client 156 includes: an interface device (not shown) coupled to and capable of communicating with at least the management server 150; an input device (for example, a keyboard and a pointing device); a display device; a memory; and a processor coupled to them. The input device and the display device may be integrated like a touch panel.

Figure 2:
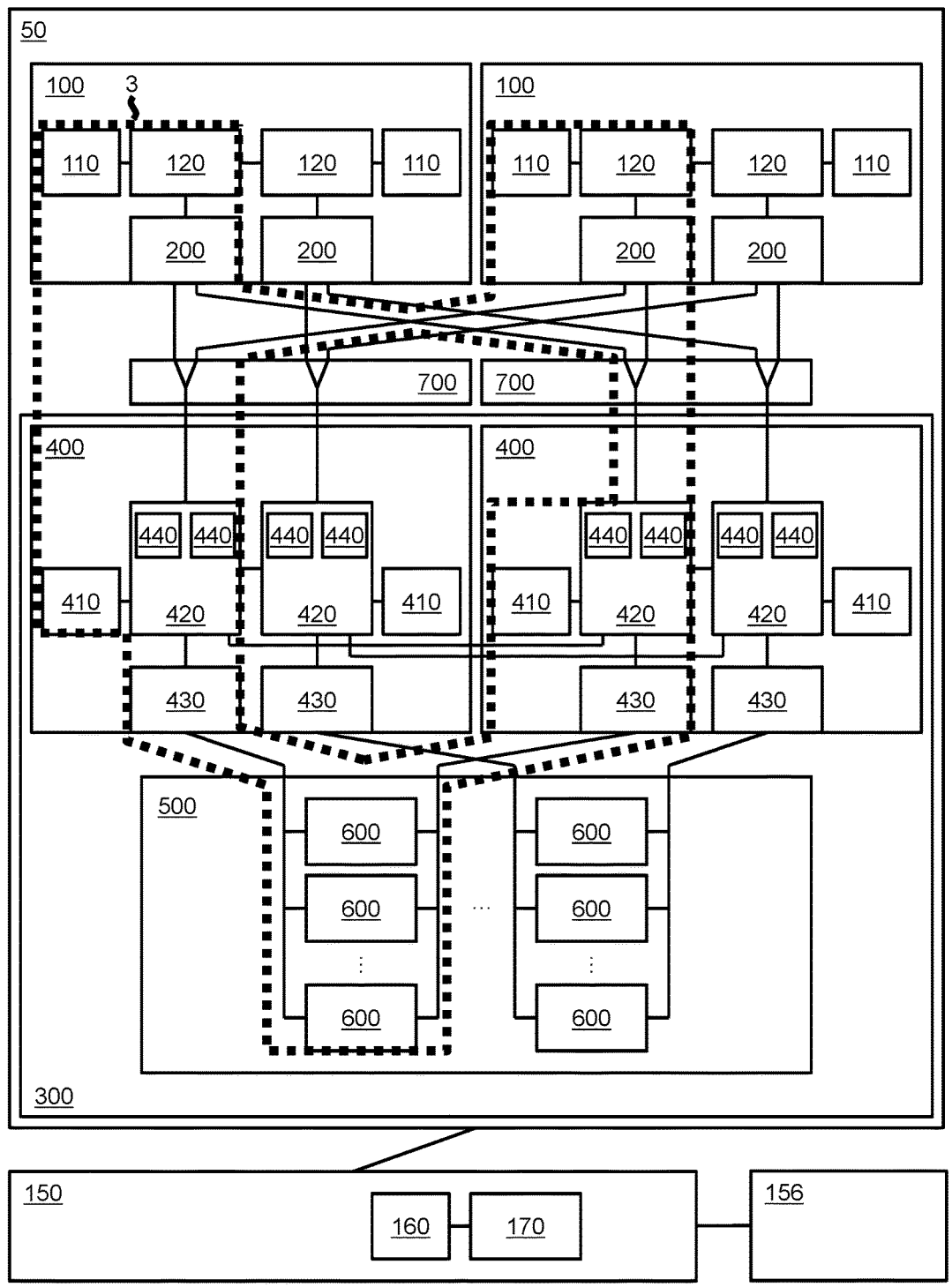
FIG. 2 shows a redundant configuration of a server storage LPAR.

FIG. 2 shows an example of a server storage LPAR with a redundant configuration.

A server storage LPAR 3 is an example of the server storage LPAR with the redundant configuration. The server storage LPAR 3 includes part of each of the two storage controllers 400 to form a redundant configuration. The SVIF 200 and the two ST controllers 400 are coupled to each other, and the ST processor 420 on each ST controller 400 and the SVIF 200 are directly connected without the involvement of another ST processor 420. The ST processor 420 on each storage controller 400 is directly connected to the drive I/430 without the involvement of another ST processor 420. The drive I/430 on each storage controller 400 is coupled to the storage device 600 through a different path. Data can pass through both the two ST controllers 400 between the SV processor 120 and the storage device 600.

Note that thick dashed line frames 1 to 3 indicate the server storage LPARs respectively in FIGS. 1 and 2, and the elements in the illustrated server storage LPARs are elements of dedicatedly allocated elements (allocation state described later is "dedicated"). The elements included (allocated) in the server storage LPARs can be, for example, at least part of the SV memories, at least part of the SV processors directly connected to the SV memories (for example, entire cores or processors), at least part of the SVIFs directly connected to the SV processors (for example, one or all of two interfaces 260 described later), at least part of the ST processors coupled to the SVIFs (for example, entire ST cores or ST processors), and at least part of the ST memories directly connected to the ST processors (for example, CLPAR described later). It is desirable that the server storage LPARs do not include any type of indirect connection of the present Embodiment.

Figure 3:
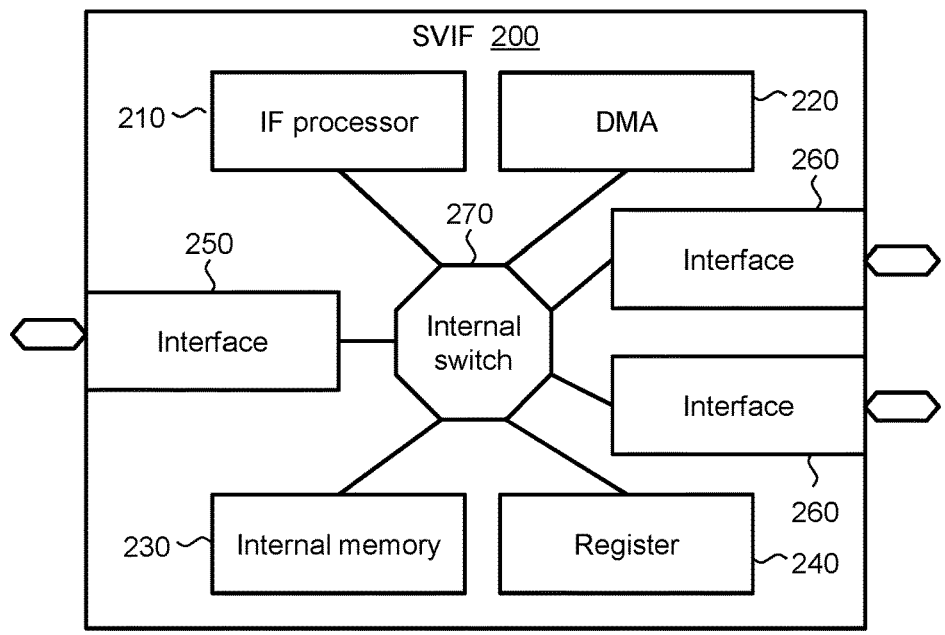
FIG. 3 shows a configuration of an SVIF.

FIG. 3 shows a configuration of the SVIF 200.

The SVIF 200 is, for example, an ASIC (Application Specific Integrated Circuit). The SVIF 200 includes an IF (Interface) processor 210, a DMA (Direct Memory Access) controller 220, an internal memory 230, a register 240, an interface 250, the two interfaces 260, and an internal switch 270. The DMA controller 220 will be simply called "DMA" in some cases. The IF processor 210, the DMA controller 220, the internal memory 230, the register 240, the interface 250, and the two interfaces 260 are coupled to each other through the internal switch 270. The interface 250 on one hand is coupled to the SV processor 120 through the server side bus. The two interfaces 260 on the other hand are coupled to the two ST processors 420, respectively, through the storage side bus. The internal memory 230 is a memory and is configured to store programs and data. The IF processor 210 is a microprocessor and is configured to execute processes according to the programs in the internal memory 230. The DMA controller 220 executes data transfer (transfer between memories) according to an instruction from the IF processor 210. The register 240 stores configuration values of the IF processor 210. The internal switch 270 controls communication between the components according to an instruction from the IF processor 210. Note that a plurality of SV side interfaces and ST side interfaces may be included and coupled to the SV processors 120 and the ST processors 420 through each bus and interface extension.

The PCIe is known as an example of a communication interface (protocol) defining the number of master devices that can exist in the same space (for example, address space). In the PCIe, the master device is generally called a "root device" (or a "root complex"), and a slave device is called an "end point". The space is called a "domain". In the PCIe, one root device can exist in the same domain, and one or more end points can be coupled to the one root device. In the SS system 50, the server processors 120 and the storage processors 420 serve as root devices, and the SVIFs 200 serve as end points to allow communication between the server processors 120 and the ST processors 420 through the SVIFs 200 (DMA communication between the SV memories 110 and the ST memories 410 through the SVIFs 200).

Figure 4:
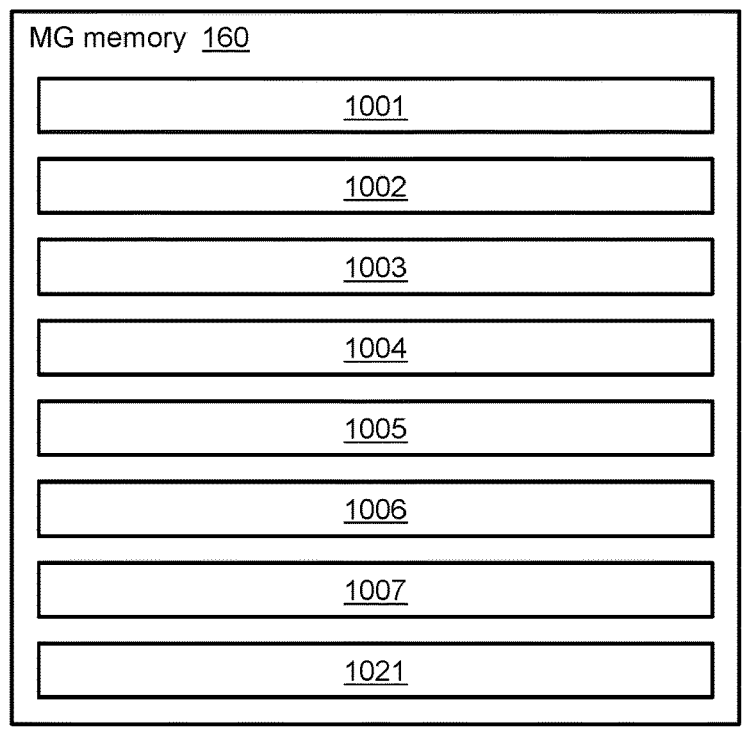
FIG. 4 shows a program and data stored in an MG memory.

FIG. 4 shows a program and data stored in the MG memory 160.

The MG memory 160 stores SS management information including information related to the configuration of the server and information related to the configuration of the storage system. The SS management information indicates a connection relationship between the SVIFs and the SV processors, a connection relationship between the SV processors and the SV memories, a connection relationship between the SVIFs and the ST processors, a connection relationship between the ST processors and the ST memories, and the like. In the SS management information, the connection relationship between the ST processors and the SVIFs is associated with the connection relationship between the SVIFs and the SV processors. This allows specifying, from the SS management information, directly connected elements, particularly, the SV processors and the ST processors (ST memories) directly connected to each other, and specifying the end-to-end direct connection relationship from the server to the storage system. The SS management information includes, for example, an SVIF management table 1001, a RAID group allocation table 1002, a device I/F allocation table 1003, an ST core allocation table 1004, an ST memory allocation table 1005, an SVIF allocation table 1006, and an LPAR allocation table 1007. The MG memory 160 also stores a management program 1021. The tables and the program will be described later.

Figure 5:
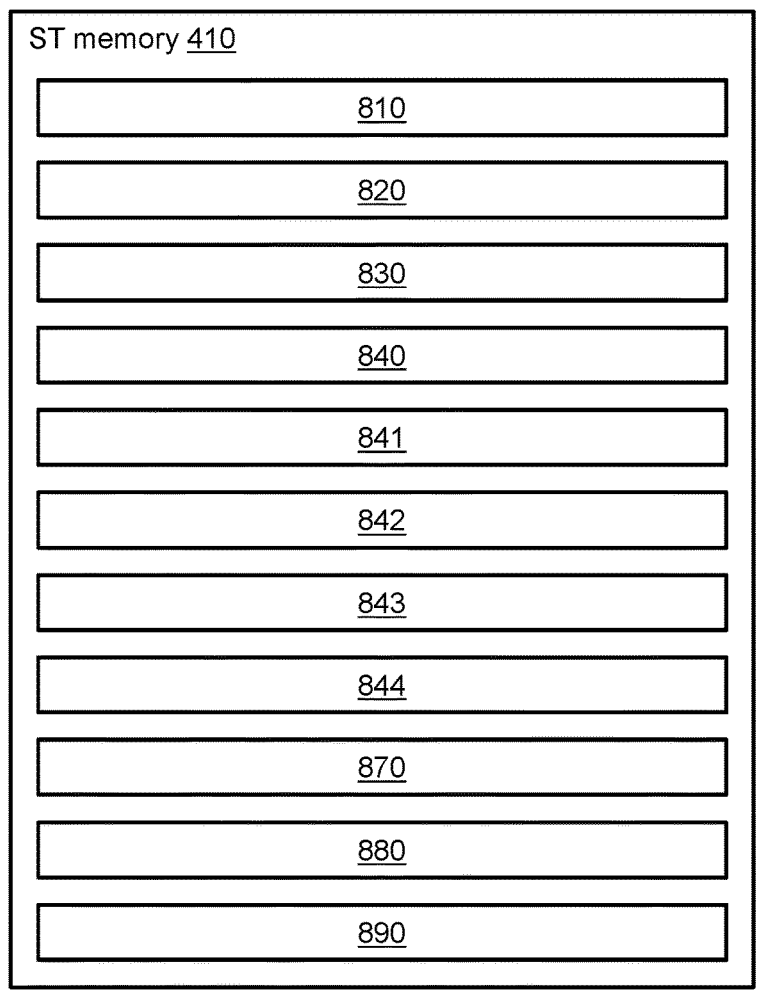
FIG. 5 shows a program and data stored in an ST memory.

FIG. 5 shows a program and data stored in the ST memory 410.

The ST memory 410 stores ST management information including information related to the configuration of the storage system. The ST management information indicates a connection relationship between the ST processors and the ST memories and the like. The ST management information includes, for example, a virtual volume management table 810, a storage pool management table 820, a RAID group management table 830, a storage device management table 840, a device I/F management table 841, an ST processor management table 842, an ST core management table 843, and an ST memory management table 844. The tables will be described later. The ST memory 410 also stores a storage control program 870. The storage control program 870 executes, for example, an I/O (input/output) process disclosed in U.S. Patent Application Publication No. 2011/0208940. The storage control program 870 further executes a process described later. A storage (ST) cache area 880 and a storage (ST) buffer area 890 are further reserved in the ST memory 410. Write data or read data is temporarily stored in the ST cache area 880, and the ST cache area 880 is used to hit the data for a write request or a read request. Data and control information transmitted and received by the ST controller 400 are stored in the ST buffer area 890.

Figure 6:
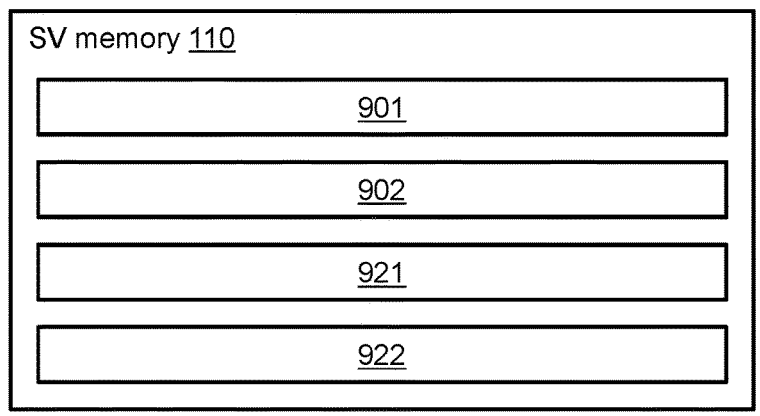
FIG. 6 shows programs and data stored in an SV memory.

FIG. 6 shows programs and data stored in the SV memory 110.

The SV memory 110 stores SV management information including information related to the configuration of the server. The SV management information indicates a connection relationship between the SVIFs and the SV processors, a connection relationship between the SV processors and the SV memories, and the like. The SV management information includes, for example, an SV processor management table 901 and an LPAR management table 902. The tables will be described later. The SV memory 110 stores, for example, an LPAR program 921 and an application 922. The LPAR program 921 is a program for logically dividing the server 100 into a plurality of LPARs and allocating computer resources (for example, CPU, memory, and I/F) to each LPAR. An OS, an application, and the like are operated respectively on each LPAR. The application 922 is an application program and is, for example, a DBMS (Database Management System).

FIG. 7 shows the virtual volume management table 810.

The virtual volume management table 810 includes entries for each virtual volume. Each entry includes a virtual volume number (#), a volume capacity, an allocated capacity, and a pool number (#). An example of one virtual volume ("target virtual volume" in this paragraph) will be illustrated. The volume number is an identification number of the target virtual volume. The volume capacity is a capacity of the target virtual volume. The allocated capacity is a total capacity of virtual pages to which real pages are allocated (virtual pages in the target virtual volume). The pool number is an identification number of a storage pool associated with the target virtual volume (storage pool including the real pages allocated to the target virtual volume). Note that the virtual volume in the present Embodiment is a logical volume including a plurality of virtual pages (virtual storage area) and based on a capacity virtualization technology (typically, Thin Provisioning). The storage pool is a storage area including a plurality of real pages based on one or more storage devices 600. The real pages are allocated to the virtual pages of a write destination. Note that a logical volume of a type other than the virtual volume, for example, a logical volume based on one or more storage devices 600, may be adopted as the logical volume.

FIG. 8 shows the storage pool management table 820.

The storage pool management table 820 includes entries for each storage pool. Each entry includes a pool number (#) and a RAID group list. An example of one storage pool ("target storage pool" in this paragraph) will be illustrated. The pool number is an identification number of the target storage pool. The RAID group list is an identification number of a RAID (Redundant Array of Independent (or Inexpensive) Disks) group that is a basis of the target storage pool.

FIG. 9 shows the RAID group management table 830.

The RAID group management table 830 includes entries of each RAID group. Each entry includes a RAID group number (#), a RAID level, storage device numbers (#), a device type, a capacity, and device I/F numbers (#). An example of one RAID group ("target RAID group" in this paragraph) will be illustrated. The RAID group number is an identification number of the target RAID group. The RAID level indicates a RAID level of the target RAID group. The storage device numbers are identification numbers of storage devices (physical storage devices) included in the target RAID group. The device type indicates a device type of the storage devices included in the target RAID group. The capacity shows a usable capacity of the target RAID group. The capacity is determined by, for example, the capacity of the storage devices included in the target RAID group and the RAID level of the target RAID group. The device I/F numbers indicate identification numbers of the device I/Fs coupled with the storage devices included in the target RAID group.

FIG. 10 shows the storage device management table 840.

The storage device management table 840 includes entries for each storage device. Each entry includes a storage device number (#), a physical capacity, a device type, and device I/Fs. An example of one storage device ("target storage device" in this paragraph) will be illustrated. The storage device number is an identification number of the target storage device. The physical capacity indicates a storage capacity of the target storage device. The device type indicates a type of the target storage device. Examples of the type of storage device include an SSD (Solid State Drive), an HDD (Hard Disk Drive) and the like. The device I/F numbers are identification numbers of the device I/Fs directly connected with the target storage device. The "direct connection" between the storage device and the device I/F is physical connection without the involvement of another device I/F between the storage device and the device I/F. On the other hand, "indirect connection" between the storage device and the device I/F is physical connection with the involvement of another device I/F between the storage device and the device I/F.

FIG. 11 shows the device I/F management table 841.

The device I/F management table 841 includes entries for each device I/F. Each entry includes a device I/F number (#), an ST processor number (#), and a controller number (#). An example of one device I/F ("target device I/F" in this paragraph) will be illustrated. The device I/F number is an identification number of the target device I/F. The ST processor number is an identification number of the ST processor directly connected with the target device I/F. The "direct connection" between the device I/F and the ST processor is physical connection without the involvement of another ST processor between the device I/F and the ST processor. On the other hand, "indirect connection" between the device I/F and the ST processor is physical connection with the involvement of another ST processor between the device I/F and the ST processor. The controller number is an identification number of the controller on which the target device I/F is arranged.

FIG. 12 shows the ST processor management table 842.

The ST processor management table 842 includes entries for each ST processor. Each entry includes an ST processor number (#), storage (ST) core numbers (#), ST memory addresses, and a controller number (#). An example of one ST processor ("target ST processor" in this paragraph) will be illustrated. The ST processor number is an identification number of the target ST processor. The ST core numbers are identification numbers of the ST cores included in the target ST processor. The ST memory addresses indicate addresses of the ST memories directly connected from the target ST processor. The "direct connection" between the ST processor and the ST memory is physical connection without the involvement of another ST processor between the ST processor and the ST memory. On the other hand, "indirect connection" between the ST processor and the ST memory is physical connection with the involvement of another ST processor between the ST processor and the ST memory. The controller number is an identification number of the controller number on which the target ST processor is arranged.

FIG. 13 shows the ST core management table 843.

The ST core management table 843 includes entries for each ST core. Each entry includes an ST core number (#), handled virtual volume numbers (#), and a controller number (#). An example of one ST core ("target ST core" in this paragraph) will be illustrated. The ST core number is an identification number of the target ST core. The handled virtual volume numbers are identification numbers of the virtual volumes of the I/O destination of the target ST core (that is, virtual volumes handled by the target ST core). The controller number is an identification number of the controller number on which the target ST core is arranged.

FIG. 14 shows the ST memory management table 844.

The ST memory management table 844 includes entries for each CLPAR (Cache Logical Partition). The CLPAR is a logical partition of a cache memory area obtained by logically dividing the cache memory area. Each entry includes an ST processor number (#), ST memory addresses, a CLPAR number (#), virtual volume numbers (#), and a controller number (#). An example of one CLPAR ("target CLPAR" in this paragraph) will be illustrated. The ST processor number is an identification number of the ST processor that can directly access the memory of the target CLPAR (in other words, the ST processor directly connected to the ST memory that is a basis of the target CLPAR). The ST memory addresses show addresses of the target CLPAR (addresses in the ST memory). The CLPAR number is an identification number of the target CLPAR. The virtual volume numbers are identification numbers of the virtual volumes used for the I/O by the target CLPAR. That is, the data input/output to the virtual volume is temporarily stored in the CLPAR corresponding to the virtual volume. The controller number is an identification number of the controller on which the ST memory that is a basis of the target CLPAR is arranged.

The tables 810, 820, 830, 840, 841, 842, 843, and 844 shown in FIGS. 7 to 14 are tables stored in the ST memory 410 (see FIG. 5). The ST management information including the tables indicates elements directly connected to each other in the storage system 300, indicates CLPARs and ST cores used for I/O to virtual volumes, and indicates the virtual volumes.

FIG. 15 shows the SV processor management table 901.

The SV processor management table 901 includes entries for each SV processor. Each entry includes an SV processor number (#), SV core numbers (#), and SVIF numbers (#). An example of one SV processor ("target SV processor" in this paragraph) will be illustrated. The SV processor number is an identification number of the target SV processor. The SV core numbers are identification numbers of the SV cores included in the target SV processor. The SV memory addresses indicate addresses of the SV memories directly connected from the target SV processor. The SVIF numbers are identification numbers of the SVIFs directly connected from the target SV processor.

FIG. 16 shows the LPAR management table 902.

The LPAR management table 902 includes entries for each LPAR. The "LPAR" here is a closed logical partition (server LPAR) in the server 100 and is different from the end-to-end LPAR from the server to the storage system 300 such as the server storage LPAR. Each entry includes an LPAR number (#), SV core numbers (#), SV memory addresses (#), an SV memory capacity, and SVIF numbers (#). An example of one LPAR ("target LPAR" in this paragraph) will be illustrated. The LPAR number is an identification number of the target LPAR. The SV core numbers are identification numbers of the SV cores dedicatedly used by the target LPAR. The SV memory addresses indicate addresses of the SV memories dedicatedly used by the target LPAR. The SV memory capacity indicates a memory capacity of the target LPAR. The SVIF numbers are identification numbers of the SVIFs dedicatedly used by the target LPAR. A correspondence relationship between the SV cores and the SV processors may also be registered in the table 902 or in another table.

The tables 901 and 902 shown in FIGS. 15 and 16 are tables stored in the SV memory 110 (see FIG. 6). The SV management information including the tables indicates elements directly connected to each other in the server 100.

FIG. 17 shows the SVIF management table 1001.

The SVIF management table 1001 includes entries for each SVIF. Each entry includes an SVIF number (#), an SV processor number (#), and ST processor numbers (#). An example of one SVIF ("target SVIF" in this paragraph) will be illustrated. The SVIF number is an identification number of the target SVIF. The SV processor number is an identification number of the SV processor directly connected to the target SVIF. The ST processor numbers are identification numbers of the ST processors directly connected to the target SVIF.

FIG. 18 shows the RAID group allocation table 1002.

The RAID group allocation table 1002 includes entries for each RAID group. Each entry includes a RAID group number (#), an allocation state, and a server storage LPAR number (#). An example of one RAID group ("target RAID group" in this paragraph) will be illustrated. The RAID group number is an identification number of the target RAID group. The allocation state indicates an allocation state of the target RAID group. An allocation state "dedicated" indicates that the target RAID group is dedicatedly allocated, and an allocation state "shared" indicates that the target RAID group is not dedicatedly allocated. The server storage LPAR number is a value set when the allocation state is "dedicated" and is an identification number of the server storage LPAR occupying the target RAID group.

FIG. 19 shows the device I/F allocation table 1003.

The device I/F allocation table 1003 includes entries for each device I/F. Each entry includes a device I/F number (#), an allocation state, and a server storage LPAR number (#). An example of one device I/F ("target device I/F" in this paragraph) will be illustrated. The device I/F number is an identification number of the target device I/F. The allocation state indicates an allocation state of the target device I/F. An allocation state "dedicated" indicates that the target device I/F is dedicatedly allocated, and an allocation state "shared" indicates that the target device I/F is not dedicatedly allocated. The server storage LPAR number is a value set when the allocation state is "dedicated" and is an identification number of the server storage LPAR occupying the target device I/F.

FIG. 20 shows the ST core allocation table 1004.

The ST core allocation table 1004 includes entries for each ST core. Each entry includes an ST processor number (#), an ST core number (#), an allocation state, and a server storage LPAR number (#). An example of one ST core ("target ST core" in this paragraph) will be illustrated. The ST processor number is an identification number of the ST processor on which the target ST core is arranged. The ST core number is an identification number of the target ST core. The allocation state indicates an allocation state of the target ST core. An allocation state "dedicated" indicates that the target ST core is dedicatedly allocated, and an allocation state "shared" indicates that the target ST core is not dedicatedly allocated. The server storage LPAR number is a value set when the allocation state is "dedicated" and is an identification number of the server storage LPAR occupying the target ST core.

FIG. 21 shows the ST memory allocation table 1005.

The ST memory allocation table 1005 includes entries for each CLPAR. Each entry includes a CLPAR number (#), an allocation state, and a server storage LPAR number (#). An example of one CLPAR ("target CLPAR" in this paragraph) will be illustrated. The CLPAR number is an identification number of the target CLPAR. The allocation state shows an allocation state of the target CLPAR. An allocation state "dedicated" indicates that the target CLPAR is dedicatedly allocated, and an allocation state "shared" indicates that the target CLPAR is not dedicatedly allocated. The server storage LPAR number is a value set when the allocation state is "dedicated" and is an identification number of the server storage LPAR occupying the target CLPAR.

FIG. 22 shows the SVIF allocation table 1006.

The SVIF allocation table 1006 includes entries for each SVIF. Each entry includes an SVIF number (#), an allocation state, and a server storage LPAR number (#). An example of one SVIF ("target SVIF" in this paragraph) will be illustrated. The SVIF number is an identification number of the target SVIF. The allocation state indicates an allocation state of the target SVIF. An allocation state "dedicated" indicates that the target SVIF is dedicatedly allocated, and an allocation state "shared" indicates that the target SVIF is not dedicatedly allocated. The server storage LPAR number is a value set when the allocation state is "dedicated" and is an identification number of the server storage LPAR occupying the target SVIF.

FIG. 23 shows the LPAR allocation table 1007.

The LPAR allocation table 1007 includes entries for each LPAR (closed logical partition in the server 100). Each entry includes an LPAR number (#), an allocation state, and a server storage LPAR number (#). An example of one LPAR ("target LPAR" in this paragraph) will be illustrated. The LPAR number is an identification number of the target LPAR. The allocation state indicates an allocation state of the target LPAR. An allocation state "dedicated" indicates that the target LPAR is dedicatedly allocated, and an allocation state "shared" indicates that the target LPAR is not dedicatedly allocated. The server storage LPAR number is a value set when the allocation state is "dedicated" and is an identification number of the server storage LPAR occupying the target LPAR.

The tables 1001, 1002, 1003, 1004, 1005, 1006, and 1007 shown in FIGS. 17 to 23 are tables stored in the MG memory 160 (see FIG. 4). The tables indicate elements directly connected to each other in the storage systems 300, elements directly connected to each other in the servers 100, SV processors and ST processors directly connected to SVIFs, the SVIFs, elements dedicated to one server storage LPAR, and elements usable from any server storage LPAR. Other than the tables, the SS management information may also include the information included in the SV management information (a plurality of tables) stored in the SV memories and the information included in the ST management information (a plurality of tables) stored in the ST memories. The SV processors and the ST processors (ST memories) directly connected to each other can be specified based on the SS management information. At least part of the SS management information may be information collected by the MG processor 170 (management program 1021) from at least one of the server 100 and the storage system 300 or may be information generated based on the information. Information of at least part of the SS management information may be information input from the management client 156. It is assumed in the following description that other than the tables shown in FIGS. 17 to 23, the tables shown in FIGS.

7 to 16 are also stored in the MG memory 160 as, for example, results of the information collection.

FIG. 24 shows a server storage LPAR creation screen 180.

The server storage LPAR creation screen 180 is an example of a user interface such as a GUI (Graphical User Interface). The screen 180 is displayed in the management client 156 by the management program 1021, for example. Specifically, the management program 1021 transmits information for display of the screen 1806 to the management client 156, and the management client 156 displays the screen 180 based on the information for display, for example.

The screen 180 includes the number of SV processors, the number of SV cores, the SV memory capacity, and the number of SVIFs as input items of the server. The screen 180 also includes, as input items of the storage system: the capacity and the number of created volumes; the total capacity, the type, and the RAID level of the device; the number of device I/Fs; the number of ST processors; the number of ST cores; the ST memory capacity; and absence or presence of the redundant configuration. The screen 180 receives a selection of whether each of at least one of the input items is to be dedicatedly allocated based on, for example, presence or absence of a check mark. The screen 180 also includes a "create" button. The "create" button is a button for receiving an instruction for creation.

For each of the plurality of input items in the screen 180, the user can input at least one of a unit of designating the item, the number of elements allocated to the server storage LPAR to be created based on the designated unit (for example, input of number), and whether the allocated elements are to be dedicatedly allocated (for example, designated based on presence or absence of a check mark). In the screen 180, the user can also input whether the configuration of the server storage LPAR to be created is a redundant configuration. The input items will be described later.

Note that the server storage LPAR is a partition obtained by logically dividing the SS system 50 end-to-end from the server 100 to the storage system 300 and is typically a logical partition including part of the server 100 and part of the storage system 300. Therefore, in the present Embodiment, the check marks indicating the dedicated allocation are essential for at least the input items "SV processor", "the number of SVIFs", and "ST processor" in the server storage LPAR creation screen 180. For example, the check marks may be set by default, and the management program 1021 may manage the check marks in a state in which the user cannot operate. Therefore, the user cannot remove the check marks for at least the input items "SV processor", "the number of SVIFs", and "ST processor". In other words, at least the SV processor (or cores), the SVIFs, and the ST processors (or cores) are dedicatedly allocated in a process shown in FIG. 26.

Figure 25:
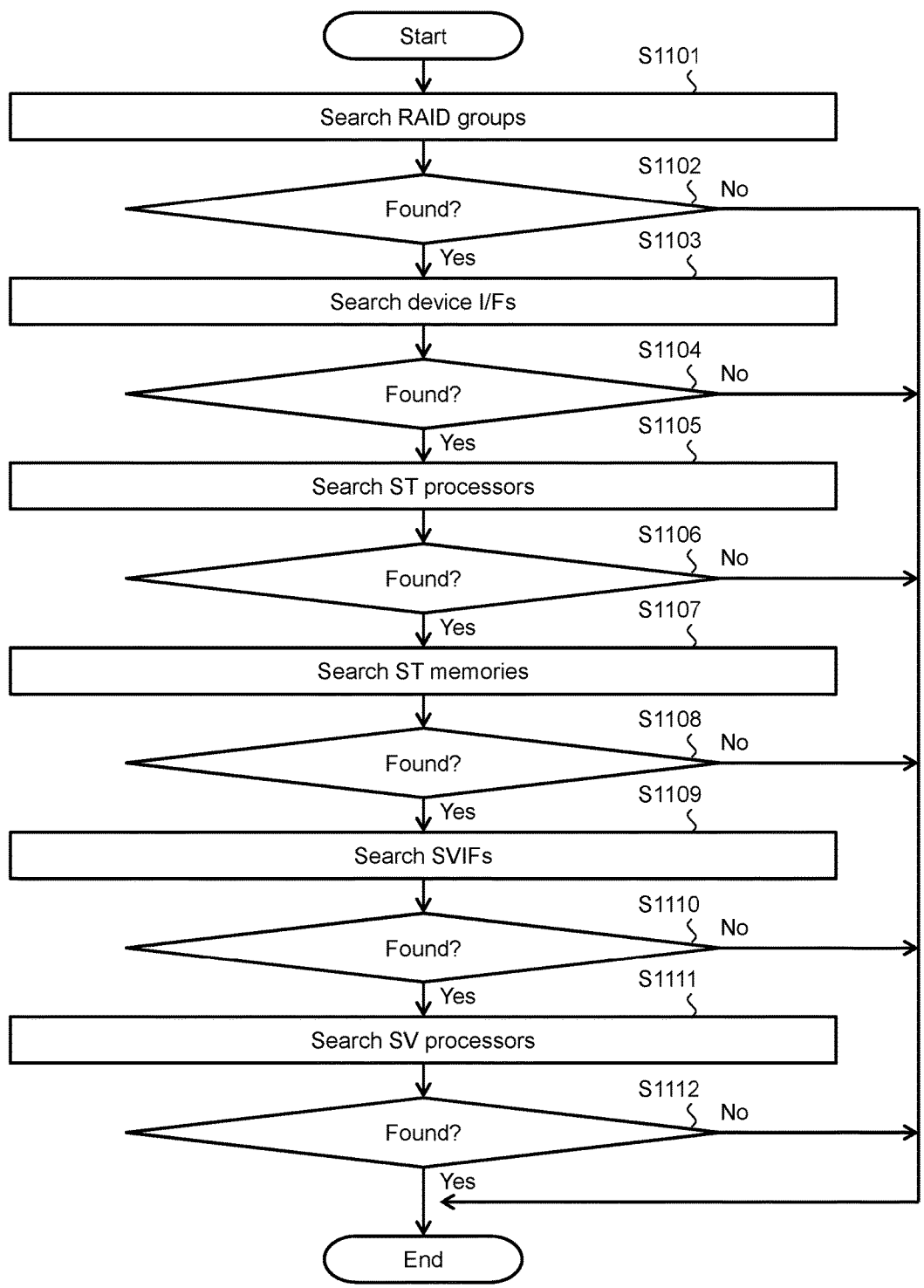
FIG. 25 shows a flow of server storage resource search related to the new creation.

FIG. 25 shows a flow of server storage resource search.

When the user (for example, manager) uses the server storage LPAR creation screen 180 to instruct creation (when the user presses the "create" button), step 1101 is executed. Note that the order of search targets is not limited to the order shown in FIG. 25.

In step 1101, the management program 1021 searches, from the RAID group management table 830, all RAID groups in which the allocation state is "shared" in the RAID group allocation table 1002 and satisfying the capacity, the device type, and the RAID level input in the server storage LPAR creation screen 180. When the capacity condition is not satisfied in one RAID group, a plurality of RAID groups satisfying the condition are added to search the RAID group satisfying the capacity condition.

If the RAID groups satisfying the conditions are found (step 1102: Yes), the management program 1021 proceeds to step 1103. If the RAID groups satisfying the conditions are not found (step 1102: No), the management program 1021 displays a lack of resources (for example, a message) and ends the process.

In step 1103, the management program 1021 uses the RAID group management table 830 to specify, for each of the RAID groups found in step 1101, the device I/Fs coupled to the RAID group and specifies the devices I/Fs in which the allocation state is "shared" in the device I/F allocation table 1003 among the specified device I/Fs. When the redundant configuration is instructed in the server storage LPAR creation screen 180 (when the server storage LPAR is designated to have a redundant configuration), the management program 1021 specifies a plurality of different device I/Fs coupled to a plurality of different ST controllers, respectively.

If the device I/Fs satisfying the condition for all RAID groups are found (step 1104: Yes), the management program 1021 proceeds to step 1105. If the device I/Fs satisfying the condition are not found (step 1104: No), the management program 1021 displays a lack of resources and ends the process.

In step 1105, the management program 1021 uses the device I/F management table 841 to specify, for each of the device I/Fs specified in step 1103, the ST processor coupled to the device I/F. When the dedicated allocation on the basis of sockets (on the basis of ST processors) is designated in the server storage LPAR creation screen 180, the management program 1021 specifies the ST processors in which the allocation state of the ST cores in the ST processors coupled to the device I/Fs is all "shared" in the ST core allocation table 1004. When the dedicated allocation on the basis of cores is designated in the server storage LPAR creation screen 180, the management program 1021 specifies the ST processors in which the number of ST cores with the allocation state "shared" in the ST processor coupled to the device I/F in the ST core allocation table 1004 is equal to or larger than the number of ST cores designated in the server storage LPAR creation screen 180. When the redundant configuration is instructed in the server storage LPAR creation screen 180, the management program 1021 specifies a plurality of different ST processors arranged on a plurality of different ST controllers.

If the ST processors satisfying the condition are found (step 1106: Yes), the management program 1021 proceeds to step 1107. If the ST processors satisfying the condition are not found (step 1106: No), the management program 1021 displays a lack of resources and ends the process.

In step 1107, the management program 1021 uses the ST memory management table 844 to specify the CLPARs on the memories that the ST processors specified in step 1105 can directly access, in which the allocation state is "shared" in the ST memory allocation table 1005, and the ST memory capacity is equal to or larger than the ST memory capacity designated in the server storage LPAR creation screen 180. When the capacity of the CLPAR is not enough, the management program 1021 may combine a plurality of CLPARs to add the capacities of the CLPARs. If the total of the capacities of the CLPARs is equal to or larger than the ST memory capacity designated in the screen 1808, the condition is satisfied.

If the CLPARs satisfying the conditions are found (step 1108: Yes), the management program 1021 proceeds to step 1109. If the CLPARs satisfying the conditions are not found (step 1108: No), the management program 1021 displays a lack of resources and ends the process.

In step 1109, the management program 1021 uses the SVIF management table 1001 to specify the SVIFs directly connected to the ST processors specified in step 1105 and specifies the SVIFs, in which the number of SVIFs directly connected to the ST processors is equal to or larger than the number designated in the server storage LPAR creation screen 180, and the allocation state is "shared" in the SVIF allocation table 1006. Note that when the interface extension apparatuses 700 are coupled in multiple stages, the management program 1021 may select the SVIF 200 with the smallest number of interface extension apparatuses 700 in the path from the ST processor 420 to the SVIF 200. The larger the number of interface extension apparatuses 700 involved in communication is, the lower the I/O performance may be. Therefore, the selection can alleviate the reduction in the I/O performance. The number of stages of the interface extension apparatuses 700 between the ST processor 420 and the SVIF 200 may be registered in the SS management information and may be specified from the SS management information.

If the SVIFs satisfying the conditions are found (step 1110: Yes), the management program 1021 proceeds to step 1111. If the SVIFs satisfying the conditions are not found (step 1110: No), the management program 1021 displays a lack of resources and ends the process.

In step 1111, the management program 1021 uses the SVIF management table 1001 to search the SV processors directly connected with the SVIFs specified in step 1109. When the dedicated allocation on the basis of sockets is designated in the server storage LPAR creation screen 180, the management program 1021 uses the SV processor management table 901 and the LPAR management table 902 to select the SV processors in which the SV cores in the SV processors are not used in any LPAR. When the dedicated allocation on the basis of cores is designated in the server storage LPAR creation screen 180, the management program 1021 selects the SV processors in which the number of SV cores not allocated to the LPARs among the SV cores in the SV processors is equal to or larger than the number of SV cores designated in the server storage LPAR creation screen 180.

If the SV processors satisfying the condition are found (step 1112: Yes), the management program 1021 proceeds to a server storage LPAR creation process. If the SV processors satisfying the condition are not found (step 1112: No), the management program 1021 displays a lack of resources and ends the process.

Figure 26:
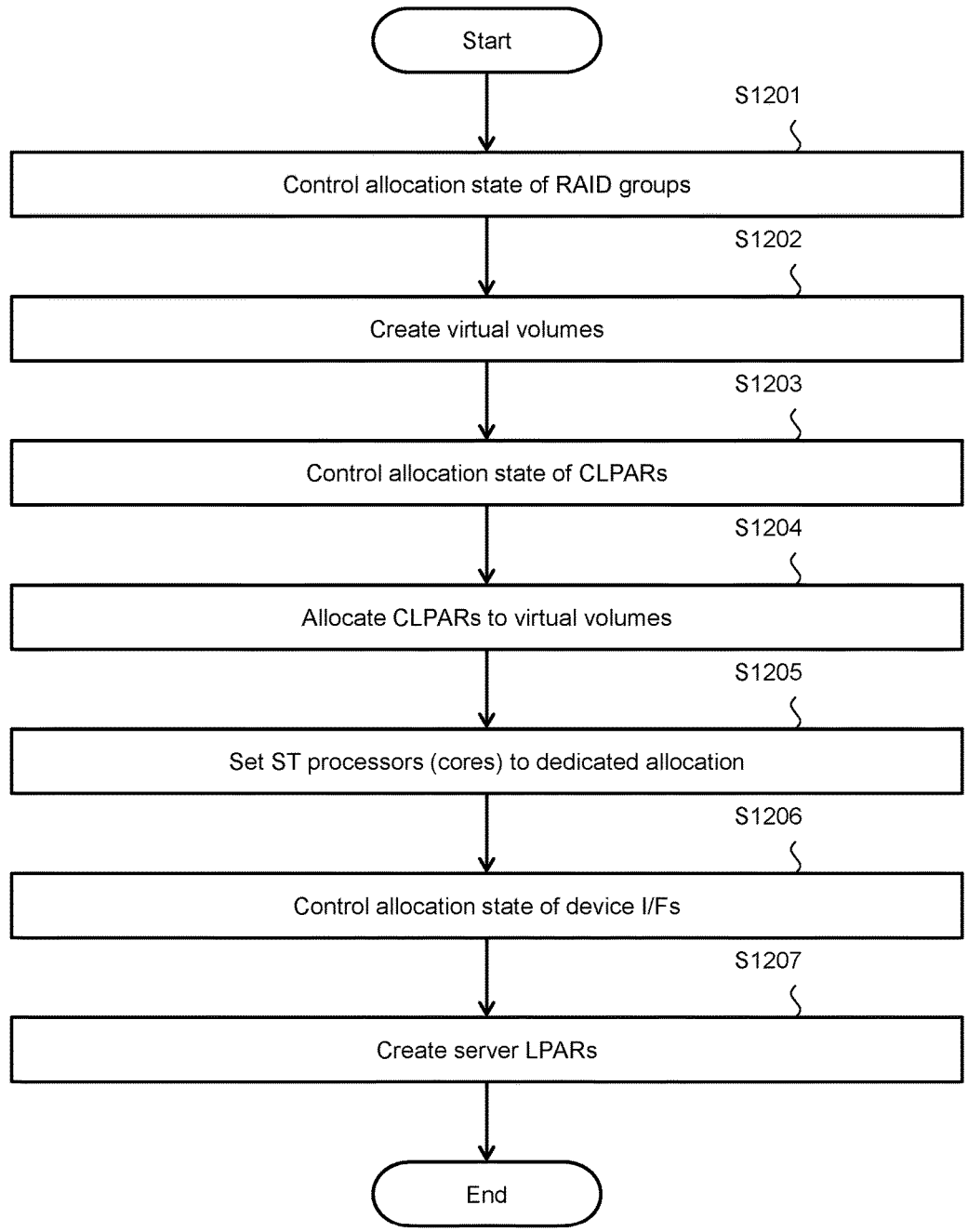
FIG. 26 shows a flow of server storage LPAR creation related to the new creation.

FIG. 26 shows a flow of server storage LPAR creation.

In step 1201, when the "dedicated allocation" of the "device" of the server storage LPAR creation screen 180 is checked, the management program 1021 updates the RAID group allocation table 1002 to set the RAID groups specified in the process of FIG. 25 to the dedicated allocation. As a result, the allocation state of the RAID groups specified in the process shown in FIG. 25 becomes "dedicated" in the RAID group allocation table 1002. When the "dedicated allocation" of the "device" of the server storage LPAR creation screen 180 is not checked, the allocation state "shared" of the RAID groups specified in the process shown in FIG. 25 is maintained.

In step 1202, the management program 1021 transmits, to the storage control program 870, an instruction for creating storage pools based on the RAID groups specified in the process shown in FIG. 25 and virtual volumes associated with the storage pools. The storage control program 870 creates the storage pools and the virtual volumes associated with the storage pools according to the instruction and updates the storage pool management table 820 and the virtual volume management table 810. As a result, entries corresponding to the created storage pools are added to the storage pool management table 820, and entries corresponding to the created virtual volumes are added to the virtual volume management table 810.

In step 1203, when the "dedicated allocation" of the "ST memory capacity" of the server storage LPAR creation screen 180 is checked, the management program 1021 updates the ST memory allocation table 1005 to set the CLPARs specified in the process shown in FIG. 25 to the dedicated allocation. As a result, the allocation state of the specified CLPARs becomes "dedicated". When the "dedicated allocation" of the "ST memory capacity" of the server storage LPAR creation screen 180 is not checked, the allocation state "shared" of the specified CLPARs is maintained. Note that when the capacity of the specified CLPAR is larger than the ST memory capacity designated in the server storage LPAR creation screen 180, the CLPAR may be divided. In this case, the management program 1021 may transmit an instruction for dividing the CLPAR to the storage control program 870, and the storage control program 870 may divide the CLPAR according to the instruction and update the ST memory management table 844. CLPARs with the designated ST memory capacity and other CLPARs may be obtained as a result of the division.

In step 1204, the management program 1021 transmits, to the storage control program 870, an instruction for changing the configuration such that the virtual volumes created in step 1202 use the dedicatedly allocated CLPARs. If the virtual volumes that are not the virtual volumes created in step 1202 are set to use the dedicatedly allocated CLPARs when the "dedicated allocation" of the "ST memory capacity" of the server storage LPAR creation screen 180 is checked, the instruction for changing the configuration includes a change in the configuration for causing the virtual volumes to use other CLPARs. In this case, migration destination CLPARs (CLPARs selected by the management program 1021 and designated as migration destinations by the storage control program 870) are CLPARs in which the allocation state is "shared". The storage control program 870 updates the virtual volume numbers of the ST memory management table 844 according to the instruction.

In step 1205, when the "dedicated allocation" of the "socket" of the "ST processor" of the server storage LPAR creation screen 180 is checked or when the "dedicated allocation" of the "core" of the "ST processor" is checked, the management program 1021 updates the ST core allocation table 1004 to set the ST processors or the ST cores specified in the process shown in FIG. 25 to the dedicated allocation. As a result, the allocation state of the specified ST processors or ST cores becomes "dedicated". The management program 1021 transmits, to the storage control program 870, an instruction for changing the configuration such that the ST processors or the ST cores specified in the process shown in FIG. 25 process the virtual volumes created in step 1202. The storage control program 870 updates the handled virtual volume numbers of the ST core management table 843 according to the instruction. When the ST processors or the ST cores specified in the process shown in FIG. 25 handle processes of virtual volumes that are not the virtual volumes created in step 1202, the management program 1021 transmits, to the storage control program 870, an instruction for moving the virtual volumes to other ST cores (instruction for changing the handled ST cores of the virtual volumes that are not the virtual volumes created in step 1202 to other ST cores). In this case, the ST cores selected as migration destinations are ST cores in which the allocation state is "shared". The storage control program 870 updates the ST core management table 843. When the "dedicated allocation" of the "socket" of the "ST processor" of the server storage LPAR creation screen 180 is not checked and the "dedicated allocation" of the "core" of the "ST processor" is not checked, the allocation state "shared" of the specified ST processors or ST corers is maintained. Note that as described above, when it is essential to check the "dedicated allocation" of one of the "socket" and the "core" of the "ST processor", at least the ST processors or the cores of the ST processors are the essential constituent elements of the server storage LPAR.

In step 1206, when the "dedicated allocation" of "the number of device I/Fs" is checked in the server storage LPAR creation screen 180, the management program 1021 updates the device I/F allocation table 1003 to set the device I/Fs specified in the process shown in FIG. 25 to the dedicated allocation. As a result, the allocation state of the specified device I/Fs becomes "dedicated". The management program 1021 transmits, to the storage control program 870, an instruction for migrating the virtual volumes for which the processes are handled by the ST cores on the ST processors directly connected to the device I/Fs specified in the process shown in FIG. 25, to the ST cores on other ST processors (instruction for migrating the handling (ownership) of the virtual volumes handled by the ST cores on the ST processors directly connected to the device I/Fs specified in the process shown in FIG. 25, to the ST cores on other ST processors). In this case, the ST cores selected as the migration destinations (ST cores selected by the management program 1021 and designated by the storage control program 870) are ST cores in which the allocation state is "shared". The storage control program 870 updates the handled virtual volume numbers of the ST core management table according to the instruction. As a result, the handling (ownership) of the virtual volumes handled by the ST cores on the ST processors directly connected to the device I/Fs specified in the process shown in FIG. 25 migrates to the designated ST cores on other ST processors. Note that in step 1206, when the "dedicated allocation" of "the number of device I/Fs" of the server storage LPAR creation screen 180 is not checked, the allocation state "shared" of the device I/Fs specified in the process shown in FIG. 25 is maintained.

In step 1207, the management program 1021 transmits, to the LPAR program 921, an instruction for creating LPARs (server LPARs) including the SV processors, the SV memories, and the SVIFs specified in the process shown in FIG. 25. The LPAR program 921 updates the LPAR management table 902 according to the instruction. As a result, entries of new LPARs are added to the LPAR management table 902. Note that the allocation state ("dedicated" or "shared") may be recorded for each of the SV processors (cores), the SV memories, and the SVIFs specified in the process shown in FIG. 25 in at least part of the SVIF allocation table 1006 and the LPAR management table 1007.

Instead of the ST processor allocation and the CLPAR allocation, the LPARs (storage LPARs) may be created on the storage system, and the ST processors and the ST memories may be logically divided to allocate the logically divided ST processors and ST memories (storage LPARs) to the server storage LPARs.

This concludes the description of Embodiment 1.

According to the Embodiment 1, the management program 1021 can specify the SV processors 120 and the ST processors 420 directly connected to the SVIFs 200, the SV memories 110 directly connected to the SV processors 120, and the ST memories 410 directly connected to the ST processors 420 based on the SS management information and determines the specified elements as elements included in the server storage LPARs. Therefore, the server storage LPARs do not include elements in an indirect connection relationship, and as a result, the forwarding does not occur. Specifically, the virtual volumes created in step 1202 of FIG. 26 are allocated to the ST processors (ST cores) dedicatedly allocated in step 1205, for example. Therefore, when the server storage LPARs are started, the virtual volumes are provided to the SV processors (LPARs created in step 1207) directly connected to the ST processors (ST cores) dedicatedly allocated in step 1205. As a result, the logical volumes designated by the I/O request issued from the SV processors (SV cores) are the virtual volumes created in step 1202, and the I/O request first reaches the ST processors directly connected to the SV processors (SV cores) among the plurality of ST processors. The designated virtual volumes are the handled virtual volumes for the ST processors (ST cores). Therefore, forwarding of the I/O request (forwarding between ST processors) does not occur. This can improve the I/O performance.

According to Embodiment 1, the SS system 50 is an integrated system connecting the servers 100 and the storage systems 300 by wideband buses that do not depend on the forward function of a network switch such as a so-called SAN (Storage Area Network). The connection between the SV memories and the SV processors, between the SV processors and the ST processors through the SVIFs, and between the ST processors and the ST memories are attained by busses in the same format (communication with the same protocol is possible). This can realize an extension of the bandwidth and an improvement in the latency.

According to Embodiment 1 (for example, FIG. 26), the handled virtual volumes of the ST processors (or ST cores) are virtual volumes for which the data is input and output to the RAID groups (storage devices) directly connected to the ST processors (or ST cores). Therefore, forwarding (forwarding between ST processors) can be prevented in the I/O of the data.

According to Embodiment 1 (for example, FIG. 26), the handling of the virtual volumes handled by the ST processors (or ST cores) in which the allocation state "shared" is specified migrates to other ST processors (or ST cores) in which the allocation state is "shared", and the created virtual volumes are handled by the specified ST processors (or ST cores). Therefore, the process of I/O for the virtual volumes is executed by the dedicatedly allocated ST processors (or ST cores) in which the handling of the other virtual volumes is removed. As a result, the I/O performance can be improved.

Embodiment 2

Hereinafter, Embodiment 2 will be described. In this case, differences from Embodiment 1 will be mainly described, and points in common with Embodiment 1 will not be described or simply described.

Figure 28:
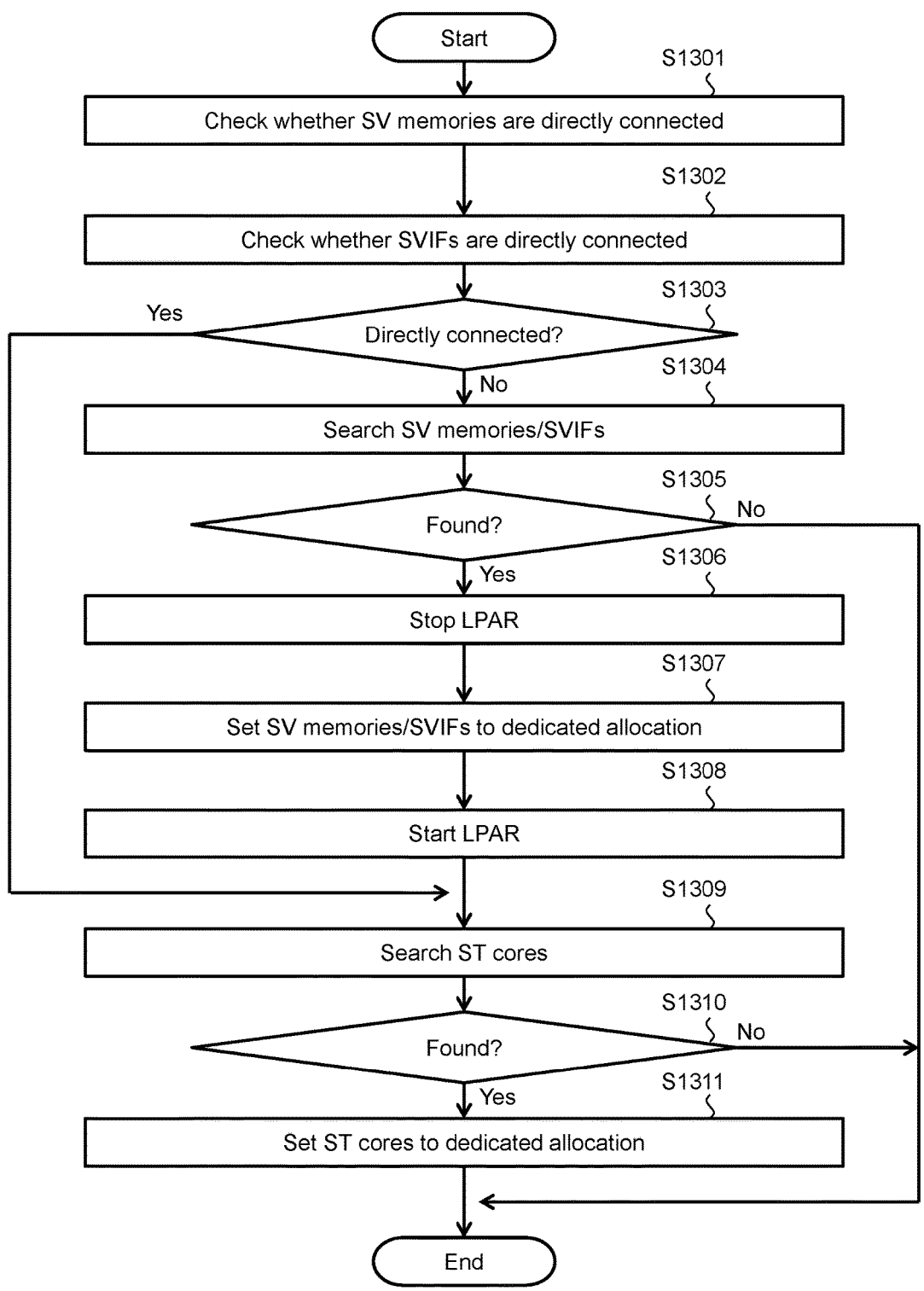
FIG. 28 shows a flow of server storage LPAR creation related to the creation using existing LPARs.

Embodiment 2 relates to creation of a server storage LPAR, and a selection of whether the management program 1021 creates a sever storage LPAR (creation using existing LPARs) by using existing LPARs (existing server LPARs) or creates a new server storage LPAR (new creation) without using the existing LPARs is received from the user. When the new creation is selected, the creation screen 180 shown in FIG. 24 is displayed, the search according to the flow shown in FIG. 25 is performed, and the creation according to the flow shown in FIG. 26 is performed. The new creation can construct the server storage LPAR without changing the configuration of the existing server LPARs or the existing sever storage LPARs. On the other hand, when the creation using existing LPARs is selected, a creation screen 181 shown in FIG. 27 is displayed, and creation according to a flow shown in FIG. 28 is performed. The creation using existing LPARs can create a server storage LPAR with a small input load (operation load) on the user. The management program 1021 may make the selection for the creation using existing LPARs or the new creation according to a predetermined policy, instead of receiving the selection from the user. For example, the management program 1021 may select the creation using existing LPARs when the ratio of the amount of shared resources to the amount of resources of the SS system exceeds a predetermined ratio and may select the new creation when the ratio of the amount of shared resources is equal to or smaller than the predetermined ratio. The shared resources are resources in which the allocation state is "shared". The unit of the amount of resources may vary depending on the type of resources.

FIG. 27 shows the server storage LPAR creation screen 181 related to the creation using existing LPARs.

The server storage LPAR creation screen 181 includes, as input items, server LPAR selection, virtual volume selection, and storage resource selection (the number of device I/Fs, the number of ST processors, the number of ST cores, ST memory capacity, and redundant configuration) and a "create" button.

A list of existing LPARs is displayed for the server LPAR selection. The management program 1021 receives, from the list, a selection of an LPAR to be included in the server storage LPAR to be created. The list of existing LPARs may be displayed based on, for example, information collected by the management program 1021 from the plurality of servers 100 (for example, information included in the LPAR management table 902).

A list of existing virtual volumes is displayed for the virtual volume selection. The management program 1021 receives, from the list, a selection of virtual volumes to be included in the server storage LPAR to be created. The list of existing virtual volumes may be displayed based on, for example, for example, information collected by the management program 1021 from the storage system 300 (for example, information included in the virtual volume management table 810).

The configuration of the storage resource selection is the same as the configuration in the screen 180 shown in FIG. 24.

FIG. 27 shows a flow of the server storage LPAR creation related to the creation using existing LPARs.

When the user uses the server storage LPAR creation screen 181 to instruct the creation, step 1301 is executed.

In step 1301, the management program 1021 uses the LPAR management table 902 and the SV processor management table 901 to determine whether the SV processors and the SV memories are directly connected to each other in the LPAR ("designated LPAR" in the description of FIG. 27) selected from the list of existing LPARs of the screen 181.

In step 1302, the management program 1021 uses the LPAR management table 902 and the SVIF management table 1001 to determine whether the SV processors and the SVIFs are directly connected to each other in the designated LPAR.

If it is determined that both the SV memories and the SVIFs are directly connected to the SV processors in the designated LPAR (step 1303: Yes), the management program 1021 proceeds to step 1309. Otherwise (step 1303: No), the management program 1021 proceeds to step 1304.

When the SV memories are not directly connected to the SV processors, the management program 1021 uses the SV processor management table 901, the LPAR management table 902, and the LPAR allocation table 1007 to search the SV memories directly connected to the SV processors in the designated LPAR in step 1304. In the search of the SV memories, the management program 1021 searches the SV memories with the same capacity (or more capacity) as the SV memories in the current LPAR (designated LPAR) and not allocated to other dedicatedly allocated LPARs, among the SV memories directly connected to the SV processors. When the SVIFs are not directly connected to the SV processors, the management program 1021 uses the LPAR management table 902, the SVIF management table 1001, and the SVIF allocation table 1006 to search the SVIFs directly connected to the SV processors in the designated LPAR and not dedicatedly allocated in step 1304.

If the search target is found (step 1305: Yes), the management program 1021 proceeds to step 1306. If the search target is not found (step 1305: No), the management program 1021 displays a lack of resources and ends the process.

In step 1306, the management program 1021 transmits an instruction for stopping the designated LPAR to the LPAR program 921. The LPAR program 921 stops the designated LPAR according to the instruction.

In step 1307, the management program 1021 transmits, to the LPAR program 921, an instruction for changing the configuration for using the SV memories found in step 1304 when the SV memories are not directly connected in the designated LPAR. The LPAR program 921 allocates the found SV memories to the designated LPAR (for example, in place of the SV memories allocated to the designated LPAR). When the SVIFs are not directly connected, the management program 1021 transmits, to the LPAR program 921, an instruction for changing the configuration for using the SVIFs found in step 1304, and the management program 1021 updates the SVIF allocation table 1006. The LPAR program 921 allocates the found SVIFs to the designated LPAR (for example, in place of the SVIFs allocated to the designated LPAR).

In step 1308, the management program 1021 transmits an instruction for starting the designated LPAR to the LPAR program 921. The LPAR program 921 starts the designated LPAR according to the instruction.

In step 1309, the management program 1021 uses the SVIF management table 1001, the ST processor management table 842, and the ST core allocation table 1004 to search the ST cores that are on the ST processors directly connected from the SVIFs in the designated LPAR and that are not dedicatedly allocated.

If a designated number of ST cores in the screen 181 are found (step 1310: Yes), the management program 1021 proceeds to step 1311. If a designated number of ST cores in the screen 181 are not found (step 1310: No), the management program 1021 displays a lack of resources and ends the process.

In step 1311, the management program 1021 transmits, to the storage control program 870, an instruction for changing the configuration to set the virtual volumes designated in the screen 181 as the handled virtual volumes corresponding to the ST cores found in step 1309. The storage control program 870 updates the handled virtual volume numbers of the ST core management table 843 according to the instruction. As a result, the numbers of the virtual volumes designated in the screen 181 are added as the handled virtual volume numbers for the ST cores found in step 1309. The management program 1021 updates the ST core allocation table 1004. As a result, the allocation state of each of the ST cores found in step 1309 is changed from "shared" to "dedicated".

Although one Embodiment has been described, the present invention is not limited to the Embodiment, and it is obvious that various changes can be made without departing from the scope of the present invention.

For example, the interface devices may not be mounted on the servers 100 as long as the interface devices (for example, ASICs), such as the SVIFs 200, are involved between the SV processors and the ST processors.

The connection relationship between the ST processors in the redundant controllers 400 may be registered in the SS management information (for example, one of the tables). This allows the management program 1021 to specify, from the SS management information, ST processors directly connected to each other in step 1203 of FIG. 26, for example. Data to be written according to a write request from the SV processor 120 is stored in two different ST memories 410 in different (or same) ST controllers 400. That is, the data to be written is duplicated. Therefore, the management program 1021 may specify, based on the SS management information, a first ST memory unit that is an ST memory unit (for example, ST memory 410 or CLPAR on the ST memory 410) directly connected to the specified ST processor unit (ST processor 420 or ST core 440) and a second ST memory unit that is an ST memory unit directly connected to the ST processor unit connected (directly connected) to the specified ST processor unit by a bus and may dedicatedly allocate the specified first and second ST memory units to the server storage LPAR. From another point of view, it can be stated that the second ST memory unit is an ST memory unit on a route with the smallest number of (smallest hop count of data to be written) nodes (for example, ST processors 420) passed through by the data to be written according to the write request received by the specified ST processor unit. Therefore, the duplication of the data to be written can be speeded up.

REFERENCE SIGNS LIST

100 . . . server, 300 . . . storage system, 150 . . . management server

The invention claimed is:

1. A computer system comprising:
a plurality of interface devices;
a server system including: a plurality of server processors coupled to the plurality of interface devices by a bus; and a plurality of server memories coupled to the plurality of server processors by a bus; and
a storage system including: a plurality of storage devices; a plurality of device interfaces (device I/Fs) coupled to the plurality of storage devices; a plurality of storage processors coupled to the plurality of interface devices by a bus and coupled to the plurality of device I/Fs; and a plurality of storage memories coupled to the plurality of storage processors by a bus, wherein the bus between the plurality of storage processors and the plurality of interface devices is a bus in a same format as a format of the bus between the plurality of server processors and the plurality of interface devices,
a logical volume, to which a ST processor unit inputs/outputs data, is configured to be provided from the ST processor unit to a server LPAR, wherein the ST processor unit is directly connected to an interface device of the server LPAR that includes an SV processor unit and that is a logical partition of the server system, the SV processor unit being a server processor or a core of the server processor, and the ST processor unit being a storage processor or a core of the storage processor;
a management system configured to allocate the server LPAR and the ST processor unit directly connected to the interface device of the server LPAR as elements of a server storage LPAR that is a logical partition of a server storage system including the plurality of interface devices, the server system, and the storage system based on management information including information indicating the SV processor unit and the ST processor unit directly connected to the interface device for each of the plurality of interface devices;
the management system is configured to specify a storage device, a device I/F coupled to the storage device, and an ST processor unit coupled to the device I/F without involvement of another ST processor unit based on the management information and configured to allocate the specified storage device, device I/F, and ST processor unit as elements of the server storage LPAR, and
the logical volume provided to the server LPAR is a logical volume in which data to be input and output is input and output to the specified storage device;
wherein
elements of the server storage system include dedicated elements used only for I/O of the server storage LPAR and shared elements also usable for I/O of any server system LPAR,
each of the plurality of ST processor units is configured to input and output data only to a handled logical volume corresponding to the ST processor unit among the plurality of logical volumes, and
the management system is configured to
specify the ST processor unit as a shared element based on the management information,
migrate handling of the logical volume corresponding to the specified ST processor unit to another ST processor unit that is a shared element and that is in a storage processor different from the specified ST processor unit,
cause the specified ST processor unit to handle the provided logical volume, and
allocate the specified ST processor unit as a dedicated element to the server storage LPAR.

2. The computer system according to claim 1, wherein interface extension apparatuses configured to allocate additional buses between the interface devices and the storage processors, and
the management system is configured to specify the ST processor unit with a smallest number of the involved interface extension apparatuses and configured to allocate the specified ST processor unit as an element of the server storage LPAR.

3. The computer system according to claim 1, wherein the storage system includes redundant controllers,
direct connection without the involvement of another storage processor between the storage processors and the storage memories and indirect connection with the involvement of another storage processor between the storage processors and the storage memories are mixed in the storage system, each of the redundant controllers includes two or more storage memories and two or more storage processors, redundant storage processors in the redundant controllers are coupled to each other by a bus, the management system is configured to specify, based on the management information, a first ST memory unit that is an ST memory unit directly connected to the specified ST processor unit and a second ST memory unit that is an ST memory unit directly connected to an ST processor unit coupled to the specified ST processor unit by a bus, the specified first and second ST memory units are allocated as elements to the server storage LPAR, and each of the first and second ST memory units is a storage memory or part of the storage memory.

4. The computer system according to claim 1, wherein elements of the server storage system include dedicated elements used only for I/O of the server storage LPAR and shared elements also usable for I/O of any server system LPAR, and the management system is configured to specify, based on the management information, shared elements including a storage device, a device I/F coupled to the storage device, an ST processor unit directly connected to the device I/F, an interface device directly connected to the ST processor unit, and an SV processor unit directly connected to the interface device, determine a logical volume in which data to be input and output is input and output to the specified storage device, cause the specified ST processor unit to handle the determined logical volume, determine a new server LPAR including the specified SV processor unit, and determine a new server storage LPAR to which at least part of the specified interface device, the new server LPAR, and the specified ST processor unit are allocated.

5. The computer system according to claim 1, wherein elements of the server storage system include dedicated elements used only for I/O of the server storage LPAR and shared elements also usable for I/O of any server system LPAR, and the management system is configured to receive a selection of a server LPAR among existing server LPARs, receive a selection of a logical volume among existing logical volumes, specify an ST processor unit as a shared element directly connected to the interface device of the selected server LPAR based on the management information, migrate handling of the logical volume corresponding to the specified ST processor unit to another ST processor unit that is a shared element and that is in a storage processor different from the specified ST processor unit, cause the specified ST processor unit to handle the selected logical volume, and allocate the specified ST processor unit to the server storage LPAR to which the selected server LPAR is allocated.

6. The computer system according to claim 1, wherein elements of the server storage system include dedicated elements used only for I/O of the server storage LPAR and shared elements also usable for I/O of any server system LPAR, and elements to be allocated as the dedicated elements to the server storage LPAR include a server LPAR and an ST processor unit among the server LPAR, the ST processor unit, a storage memory or an ST memory unit as part of the storage memory, a device I/F, and a storage device.

7. The computer system according to claim 1, wherein direct connection without the involvement of another storage processor between the storage processors and the storage memories and indirect connection with the involvement of another storage processor between the storage processors and the storage memories are mixed in the storage system, elements to be allocated as the dedicated elements to the server storage LPAR include a server LPAR, an ST memory unit, and an ST processor unit among the server LPAR, the ST processor unit, a storage memory or the ST memory unit as part of the storage memory, a device I/F, and a storage device and the management system is configured to specify a server LPAR, an ST processor unit directly connected to an interface device of the server LPAR, and an ST memory unit directly connected to the ST processor unit based on the management information and configured to set the specified server LPAR, ST processor unit, and ST memory unit as constituent elements of the server storage LPAR.

8. The computer system according to claim 1, wherein direct connection without the involvement of another server processor between the server processors and the server memories and indirect connection with the involvement of another server processor between the server processors and the server memories are mixed in the server system, the management information includes information indicating a relationship between the server processors and the server memories, the management system is configured to specify an SV processor unit and an SV memory unit directly connected to the SV processor unit based on the management information and configured to set the specified SV processor unit and SV memory unit as constituent elements of the server LPAR, and the SV memory unit is a server memory or part of the server memory.

9. The computer system according to claim 1, wherein the storage system includes redundant controllers, direct connection without the involvement of another storage processor between the storage processors and the storage memories and indirect connection with the involvement of another storage processor between the storage processors and the storage memories are mixed in the storage system, each of the redundant controllers includes a storage memory and a storage processor, the server storage LPAR has a redundant configuration, and the server storage LPAR with the redundant configuration is a server storage LPAR to which storage devices, redundant ST processor units in the redundant controllers coupled to the storage devices without the involvement of another ST processor unit, and SV processor units directly connected to the redundant ST processor units are allocated.

10. The computer system according to claim 1, wherein direct connection without the involvement of another server processor between the server processors and the server memories and indirect connection with the involvement of another server processor between the server processors and the server memories are mixed in the server system, at least one of the server LPARs includes an SV processor unit and an SV memory unit directly connected to the SV processor unit, and the SV memory unit is a server memory or part of the server memory.

11. A management method of a server storage system, the server storage system including:

a plurality of interface devices;

a server system including: a plurality of server processors coupled to the plurality of interface devices by a bus; and a plurality of server memories coupled to the plurality of server processors by a bus; and a storage system including: a plurality of storage devices; a plurality of device interfaces (device I/Fs) coupled to the plurality of storage devices; a plurality of storage processors coupled to the plurality of interface devices by a bus and coupled to the plurality of device I/Fs; and a plurality of storage memories coupled to the plurality of storage processors by a bus, wherein direct connection without the involvement of another storage processor between the storage processors and the storage memories and indirection connection with the involvement of another storage processor between the storage processors and the storage memories are mixed, and the bus between the plurality of storage processors and the plurality of interface devices is a bus in a same format as a format of the bus between the plurality of server processors and the plurality of interface devices, the management method comprising:

referencing management information including information indicating the SV processor unit and the ST processor unit directly connected to the interface device for each of the plurality of interface devices; and allocating a server LPAR and the ST processor unit directly connected to the interface device of a server LPAR as elements of a server storage LPAR that is a logical partition of a server storage system including the plurality of interface devices, the server system, and the storage system based on management information including information indicating the SV processor unit and the ST processor unit directly connected to the interface device for each of the plurality of interface devices;

specifying a storage device, a device I/F coupled to the storage device, and an ST processor unit coupled to the device I/F without involvement of another ST processor unit based on the management information and configured to allocate the specified storage device, device I/F, and ST processor unit as elements of the server storage LPAR, and wherein a logical volume provided to the server LPAR is a logical volume in which data to be input and output is input and output to the specified storage device;

wherein elements of the server storage system include dedicated elements used only for I/O of the server storage LPAR and shared elements also usable for I/O of any server system LPAR, each of the plurality of ST processor units is configured to input and output data only to a handled logical volume corresponding to the ST processor unit among the plurality of logical volumes, and wherein the management method further comprises:

specifying the ST processor unit as a shared element based on the management information, migrating handling of the logical volume corresponding to the specified ST processor unit to another ST processor unit that is a shared element and that is in a storage processor different from the specified ST processor unit, causing the specified ST processor unit to handle the provided logical volume, and allocating the specified ST processor unit as a dedicated element to the server storage LPAR.

* * * * *